(12) United States Patent
Van Zak et al.

(10) Patent No.: US 11,179,878 B2
(45) Date of Patent: Nov. 23, 2021

(54) METHODS AND APPARATUS FOR PARAMETRIC FABRICATION

(71) Applicant: Massachusetts Institute of Technology, Cambridge, MA (US)

(72) Inventors: Joshua Van Zak, Cambridge, MA (US); Jorge Duro Royo, Cambridge, MA (US); Andrea Ling, Toronto (CA); Yen-Ju Tai, Brooklyn, NY (US); Nicolas Hogan, Cambridge, MA (US); Barrak Darweesh, Kuwait (KW); Joseph Henry Kennedy, Jr., Santa Cruz, CA (US); Neri Oxman, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 291 days.

(21) Appl. No.: 16/260,124

(22) Filed: Jan. 29, 2019

(65) Prior Publication Data
US 2019/0232551 A1 Aug. 1, 2019

Related U.S. Application Data

(60) Provisional application No. 62/623,411, filed on Jan. 29, 2018.

(51) Int. Cl.
*B29C 64/106* (2017.01)
*C08L 1/02* (2006.01)
(Continued)

(52) U.S. Cl.
CPC ............ *B29C 64/106* (2017.08); *B05D 1/265* (2013.01); *B05D 7/24* (2013.01); *C08L 1/02* (2013.01);
(Continued)

(58) Field of Classification Search
CPC .............. B05D 1/265; B05D 7/24; C08L 5/06
See application file for complete search history.

(56) References Cited

U.S. PATENT DOCUMENTS

| 4,758,639 A | 7/1988 | Koyanagi et al. |
| 8,802,629 B1* | 8/2014 | Fraidenraich ............ A61P 9/00 514/16.4 |
| 2004/0096569 A1* | 5/2004 | Barkalow ............... A23L 27/79 426/660 |

OTHER PUBLICATIONS

Alves, V., et al., Characterization of biodegradable films from the extracellular polysaccharide produced by Pseudomonas oleovorans grown on glycerol byproduct; published in Carbohydrate Polymers. vol. 83, Issue 4, pp. 1582-1590, Feb. 2011.
(Continued)

*Primary Examiner* — Nathan T Leong
(74) *Attorney, Agent, or Firm* — Daly, Crowley, Mofford & Durkee, LLP

(57) ABSTRACT

Multiple colloids or hydrogels may each have a different chemical composition. A printer may extrude the colloids or hydrogels to form a physical object, in such a way that which hydrogel or colloid is deposited—or the amount of each hydrogel or colloid that is deposited—varies as a function of spatial position. Thus, the material composition and material properties of the physical object may vary at different locations. In some cases, physical properties of the structure being fabricated, such as surface roughness and hydrophilicity, are directly related to relative proportions of the materials being deposited and their fabrication processes. In some cases, cells, microorganisms, nutrients or other bioactive materials are embedded in or introduced to the fabricated structure. In some cases, the different materials in different spatial positions in the fabricated object may have different abilities to immobilize, localize, and stabilize specific nutrients and chemical signals.

9 Claims, 15 Drawing Sheets

(51) Int. Cl.
    *B05D 1/26*     (2006.01)
    *B05D 7/24*     (2006.01)
    *B33Y 30/00*     (2015.01)
    *B33Y 70/00*     (2020.01)
    *C08L 5/06*     (2006.01)
    *B33Y 10/00*     (2015.01)

(52) U.S. Cl.
    CPC ............... *B33Y 10/00* (2014.12); *B33Y 30/00* (2014.12); *B33Y 70/00* (2014.12); *C08L 5/06* (2013.01)

(56) References Cited

OTHER PUBLICATIONS

Bader, C., et al., Data-Driven Material Modeling with Functional Advection for 3 D Printing of Materially Heterogeneous Objects; published in 3D Printing and Additive Manufacturing, vol. 3, No. 2, 2016.

Duro-Royo, J., et al., Flow-based fabrication: An integrated computational workflow for design and digital additive manufacturing of multifunctional heterogeneously structured objects; published in Computer-Aided Design vol. 69, pp. 143-154, Dec. 2015.

Duro-Royo, J., et al., Physical Feedback in Fabrication Information Modeling (FIM): Analysis and Discussion of Exemplar Cases across Media, Disciplines and Scales; published in Proceedings of the eCAADe 33rd Annual Conference, Real Time: Extending the Reach of Computation, 2015.

Khalil, A., et al., A review on chitosan-cellulose blends and nanocellulose reinforced chitosan biocomposites: Properties and their applications; published in Carbohydrate Polymers, vol. 150, pp. 216-226, Oct. 2016.

Mogas Soldevila, L., et al., Form Follows Flow: A Material-driven Computational Workflow For Digital Fabrication of Large-Scale Hierarchically Structured Objects; published in ACADIA 2015, Computational Ecologies: Design in the Anthropocene, 2015.

Mogas Soldevila, L., Water-based digital design and fabrication: material, product, and architectural explorations in printing chitosan and its composites; Master of Science thesis, Massachusetts Institute of Technology, published in DSpace, Mar. 2016.

Mogas Soldevila, L., et al., Designing the Ocean Pavilion: Biomaterial Templating of Structural, Manufacturing, and Environmental Performance; published in Proceedings of the International Association for Shell and Spatial Structures (IASS), 2015.

Mogas Soldevila, L., et al., Water-based Engineering & Fabrication: Large-Scale Additive Manufacturing of Biomaterials; published in MRS Proceedings 1800 (2015), Cambridge University Press, 2015.

Tran, C., et al., Chitosan-cellulose composite materials: Preparation, Characterization and application for removal of microcystin; published in Journal of Hazardous Materials 252-253C, pp. 355-366, Mar. 2013.

\* cited by examiner

METHODS AND APPARATUS FOR PARAMETRIC FABRICATION

RELATED APPLICATIONS

This application claims the benefit of U.S. Provisional Application No. 62/623,411 filed Jan. 29, 2018 (the "Provisional").

FIELD OF TECHNOLOGY

The present invention relates generally to additive manufacturing.

SUMMARY

In exemplary implementations of this invention, multiple colloids or hydrogels are prepared or stored. These colloids or hydrogels may each have a different chemical composition. A CNC printer may extrude the colloids or hydrogels to form a physical object, in such a way that which hydrogel or colloid is deposited (or the amount of each hydrogel or colloid that is deposited) varies as a function of spatial position. Thus, the material composition and material properties of the physical object may vary at different locations in the object.

In illustrative implementations of this invention, numerous parameters are digitally controlled during fabrication. These parameters may include speed and toolpath directionality, nozzle diameter and shape, air pressure, distance from the substrate, and other operational variables. Furthermore, the parameters may include material selection. Thus, the materials extruded during fabrication (and their material properties) may themselves be parameters that are tunable at different scales and at different spatial positions of the fabricated object. For example, the hydrophilicity of a fabricated object may be precisely controlled in such a way that hydrophilicity varies as a function of spatial position within the object.

We sometimes refer to the fabrication described in the preceding two paragraphs as "parametric fabrication."

In some cases, a water-based digital fabrication (WDF) platform constructs a physical object in 2.5 or 3 dimensions. The WDF platform may do so by extruding multiple colloids or hydrogels, each with different material compositions and material properties. The WDF platform may comprise an extruder attached to a robotic arm, with real-time instruction feed and feedback capabilities. In this WDF system, designs may be generated computationally to tailor speed and motion paths, nozzle sizes, air pressure, material selection, and distance from the substrate. Modulating such parameters may enable the WDF system to tune the weight and height of extruded material, down to sub-millimeter tolerances. In some cases, the WDF platform is configured to deposit water-based materials such as polysaccharide blends, clays and cements, as well as various colloids, in 2.5- and 3-dimensions. For instance, in some cases, the WDF platform parametrically controls deposition of organic and inorganic elements such as chitosan, calcium carbonate, pectin, cornstarch, casein, agar, alginate, and cellulose.

In some cases, physical properties of the structure being fabricated are directly related to relative proportions of the materials being deposited (such as pectin, cellulose, chitosan, calcium carbonate, and starch). For instance, in some implementations, a composition with a very rough surface is produced by mixing, with water, 29% pectin w/v, 8% calcium caseinate w/v, 5% glycerin v/v, and 1% sodium hydroxide v/v. Likewise, in some cases, a composition with a very smooth surface is produced by mixing, with water, 35% pectin w/v, 2% alginate w/v, and 5% glycerin v/v. Also, in some cases, a composition that is both very hydrophilic and very smooth is produced by mixing, with water, 35% pectin w/v, 5% glycerin v/v.

In some cases, an initial group of microorganisms is embedded in or introduced to the fabricated structure. The population of these embedded microorganisms may increase rapidly in number. These microorganisms may perform functions such as bio-mineralization, microbial digestion, tissue formation, and ambient sensing.

In some cases, cells, nutrients, or other bioactive materials are embedded in or introduced to the fabricated structure. In some cases, the different materials (in different spatial positions in the fabricated object) may have different abilities to immobilize, localize, and stabilize specific nutrients and chemical signals.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

The above Figures are not necessarily drawn to scale. The above Figures show illustrative implementations of this invention, or provide information that relates to those implementations. The examples shown in the above Figures do not limit this invention. This invention may be implemented in many other ways.

DETAILED DESCRIPTION

Additive Manufacturing System

Figure 1A:
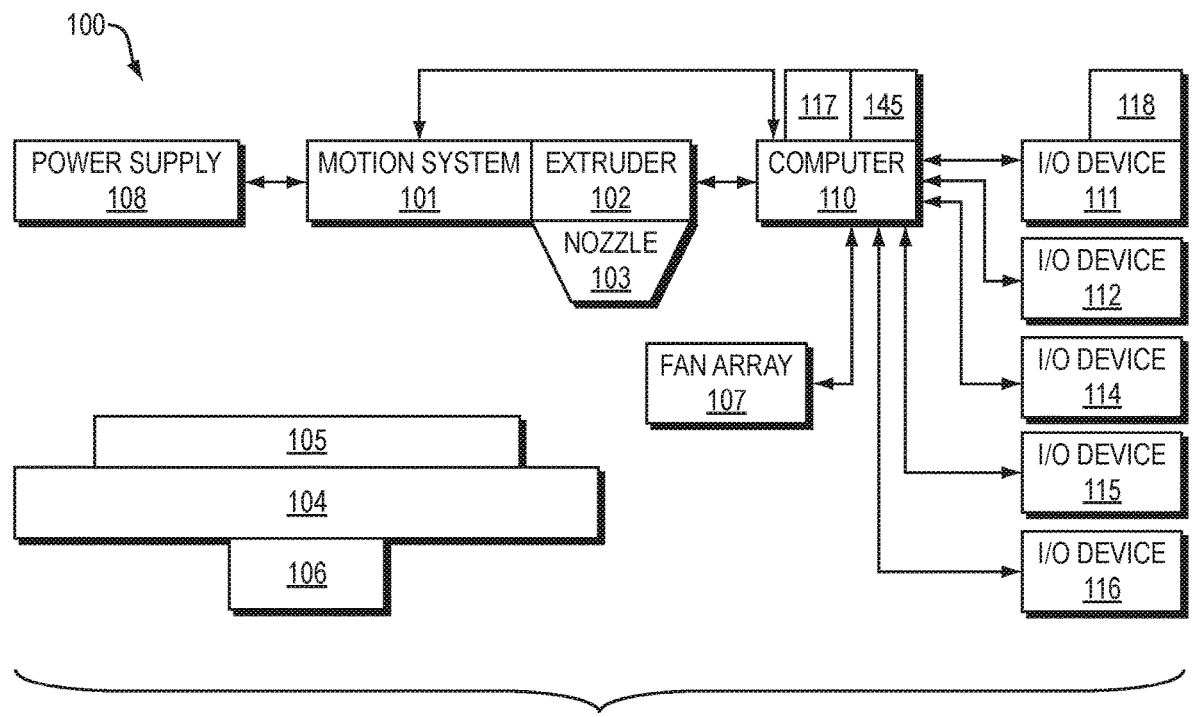
FIG. 1A is a block diagram of hardware components of an additive manufacturing system.

FIG. 1A is a block diagram of hardware components of an additive manufacturing system 100, in an illustrative implementation of this invention. For instance, additive manufacturing system 100 may comprise a WDF (water-based digital fabrication) system.

In FIG. 1, an extruder 102 extrudes material through nozzle 103, while a motion system 101 actuates movement of the extruder 102 in two or three dimensions. The motion system 101 comprises an actuator for actuating motion of the extruder. For example, in some cases, the motion system 101 comprises a robotic arm, such as a robotic arm configured to move with six degrees of freedom. Alternatively, in some cases, the motion system 101 comprises one or more motors and other hardware for actuating 2D or 3D motion (such as motors and other hardware for actuating 2D or 3D motion that are found in existing art such as CNC mills and 3D printers). For example, in some cases the hardware in the motion system 101 comprises one or more (a) motors, (b) gears, linkage systems, or power trains, and (c) gantries. In some cases, the hardware in motion system 101 further comprises (a) one or more moveable stages, and (b) bearings, rails, bushings, bearings or other motion guides. One or more power supplies 108 may provide power for components of additive manufacturing system 100. For example, in some cases, a power supply 108 provides electrical power for motion system 101 and extruder 102.

In FIG. 1A, the object that is being formed by extrusion rests on a substrate 105, that in turn rests on deposition platform 104. In some implementations, an actuator 106 actuates motion (e.g., vertical motion) of the deposition platform 104. After material is extruded, a fan array 107 blows air over the extruded material, in order to speed up curing or drying of the extruded material.

In FIG. 1A, one or more computers 110 control the operation of, or interface with, hardware components of additive manufacturing system 100. Among other things, computer 110 outputs signals to control motion system 101 and extruder 102, in such a way that the motion system 101 moves the extruder 102 in a toolpath while the extruder 102 extrudes material at appropriate times.

In FIG. 1A, a human user inputs instructions or other data via one or more I/O devices (e.g., 111, 112, 114, 115, 116). In some cases, one or more of the I/O devices (e.g., 111, 112, 114, 115, 116) outputs information in human readable form, such as by displaying a graphical user interface. For example, in some cases, the I/O devices (e.g., 111, 112, 114, 115, 116) include one or more of the following devices: a touch screen, other display screen, keyboard, mouse, microphone, speaker, haptic transducer or handheld controller (e.g., a controller that measures acceleration or motion of the controller). In some cases, wireless communication modules (e.g., 117, 118) wirelessly transmit and receive data, and are connected by wired or fiber optic communication links with other hardware components (e.g., computer 110 or I/O device 111) of the additive manufacturing system 100. The computer 110 stores data in, and accesses data from, an electronic memory device 145.

In some cases, after deposition, fan array 107 is moved near the deposition platform 104. The fan array 107 then blows air over the uncured extruded material. The air currents produced by the fan increase convection and thus the rate of evaporation of water from the uncured material, and thus reduce the time needed for the extruded material to harden.

Figure 1B:
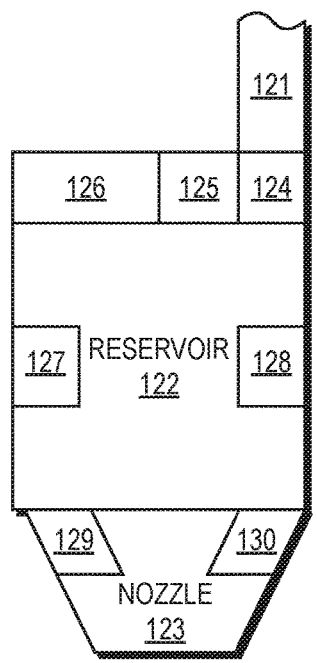
FIGS. 1B and 1C are block diagrams of extrusion systems.
Figure 1C:
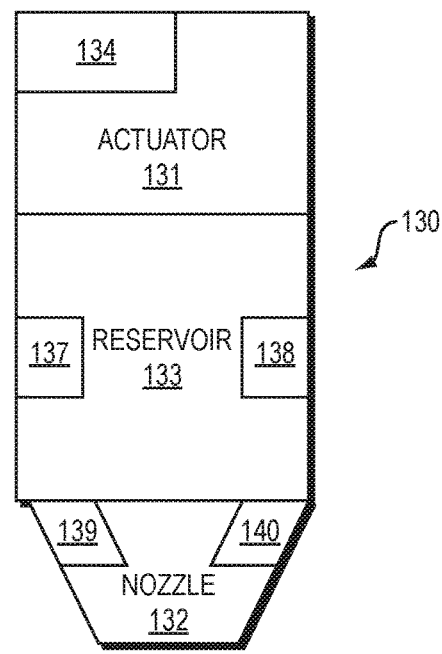

FIGS. 1B and 1C are block diagrams of extruders, in illustrative implementations of this invention.

FIG. 1B shows an example of an extruder 120 in which extrusion is actuated by fluidic or pneumatic pressure. In FIG. 1B, high-pressure fluid (e.g., air) enters reservoir 122 through hose 121, causing material in the reservoir to be extruded through one or more nozzles 123. One or more valves 124 regulate the pressure of fluid (e.g., air) entering reservoir 122. Closing or opening of the valve(s) 124 is actuated by one or more motors 125, which are controlled by a microcontroller 126, which is in turn controlled by computer 110. In some implementations, heating mechanisms 127, 128, 129, 130 heat material before it is extruded, causing it to be less viscous.

FIG. 1C shows an example of an extruder 130 in which extrusion is actuated by an actuator 131 that actuates movement of one or more solid hardware components that push, pull or otherwise apply mechanical pressure against, material and thereby cause the material to move and be extruded through one or more nozzles 132. For example, in some cases: (a) actuator 131 comprises one or more motors and one or more pumps, screws, gears, rams, or pistons; and (b) the one or more motors actuate the one or more pumps, screws, gears, rams, or pistons and thereby cause the material to move and be extruded. Actuator 131 is controlled by microcontroller 134 which is in turn controlled by computer 110. In some implementations, heating mechanisms 137, 138, 139, 140 heat material before it is extruded, causing it to be less viscous. In some cases: (a) actuator 131 applies pressure to actuate movement of solid feed (such as a filament) into a chamber where the material melts or softens into a liquid; and (b) the solid feed entering the chamber applies pressure against the liquid, causing the liquid to be extruded though a nozzle. In some cases, a heating chamber is inside a nozzle. In the example shown in FIG. 1C, the extruder 130 causes material stored in reservoir(s) 133 to be extruded.

In some implementations, the extruder is a multi-material extruder. For example, in some cases, each of the reservoirs (122, 133) comprises multiple containers, each of which stores a different material. In some implementations, the extruder includes multiple nozzles, and different materials are extruded through different nozzles. In some other cases, different materials are extruded through a single nozzle simultaneously (e.g., using coaxial nozzles, in such a way that a column of material extruded the nozzle has an outer layer of a first material and an inner layer of a second material) or at different times (e.g., to extrude a functionally graded material).

More generally, in some cases, the extruder 130 comprises any existing art extrusion system, including any existing art extrusion system that extrudes material in any 3D printing or additive manufacturing process.

Figure 2A:
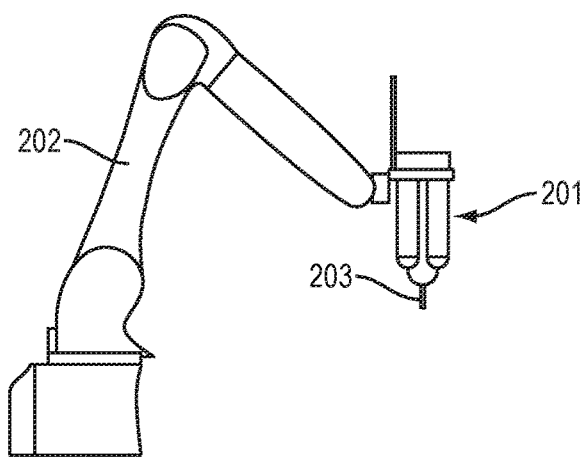
FIGS. 2A, 2B and 2C are a side view, top view and perspective view, respectively, of a robotic arm.
Figure 2B:
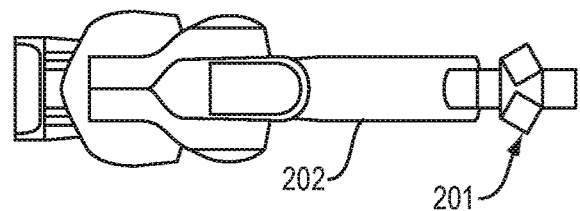
Figure 2C:
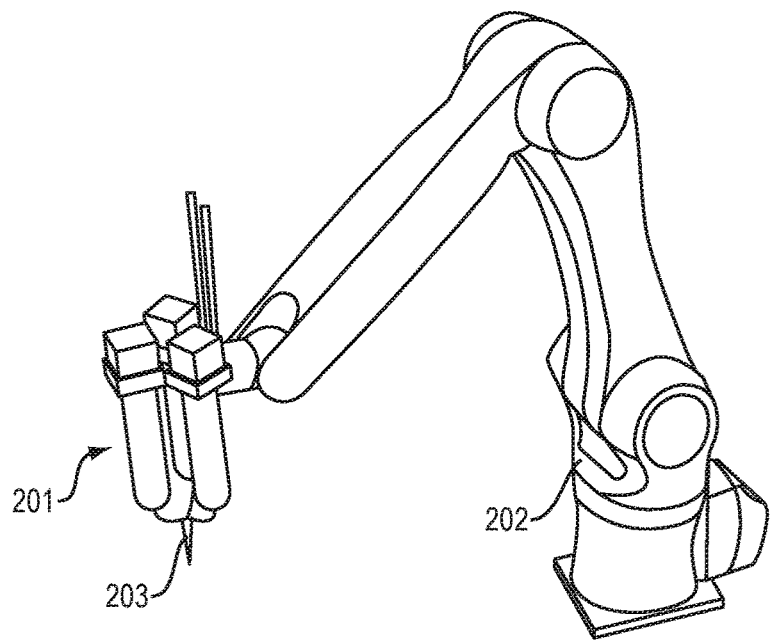

FIGS. 2A, 2B and 2C are a side view, top view and perspective view, respectively, of a robotic arm, in an illustrative implementation of this invention. A robotic arm 202 actuates motion of an extruder 201 that is attached to an end of the robotic arm 202. The robotic arm includes one or more motors, mechanical linkages, joints, and structural elements and one or more electronic computers (e.g., microcontrollers) for controlling motion of the robotic arm. The extruder 201 includes multiple reservoirs (e.g., for storing multiple different materials). The extruder 201 extrudes material through a nozzle 203.

Figure 3A:
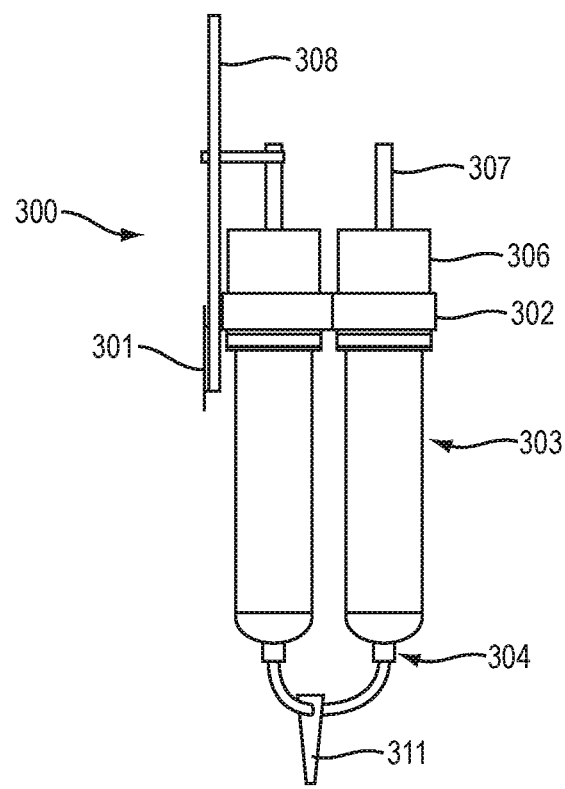
FIG. 3A shows an extruder, in which extrusion is actuated by electric motors.

FIG. 3A shows an extrusion system 300, in which extrusion is actuated by electric motors, in an illustrative implementation of this invention. In the example shown in FIG. 3A, stepper motors 306 actuate non-captive lead screws 307 that push material through a nozzle 311. The lead screws 307 are kept in alignment by lead plates 308.

Figure 3B:
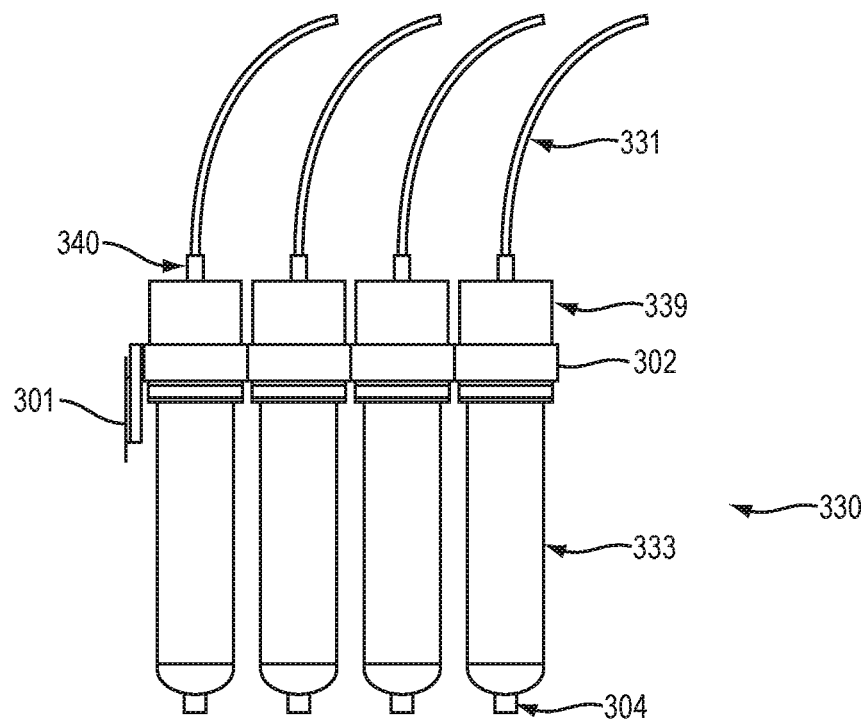
FIG. 3B shows an extruder, in which extrusion is actuated by pneumatic or fluidic pressure.

FIG. 3B shows an extrusion system 330, in which extrusion is actuated by pneumatic pressure, in an illustrative implementation of this invention. In the example shown in FIG. 3B, the extruder includes tubing 331, pressure regulators 339, and air fittings 340. Compressed air flows into the extruder 330 through the tubing 331. Each of the pressure regulators 339 (a) includes valves and motors that actuate the valves, and (b) is configured to regulate the pressure of air entering reservoirs 333. The compressed air exerts pressure against material in reservoirs 333, causing material to be extruded through a nozzle.

In the examples shown in FIGS. 3A and 3B, the material reservoirs (303, 333) are connected to a nozzle by connectors 304. Material reservoirs (303, 333) are held in place by a mounting plate 302 that is attached to a connection plate 301. The material reservoirs (e.g., 303, 333) may be fabricated from a wide variety of materials. For example, in some cases, the material reservoirs (e.g., 303, 333) comprise high-strength plastic, stainless steel or glass. The shape of the nozzle (e.g., 311) may vary. For example, the number and position of input or output orifices of a nozzle, the overall shape of a nozzle, and the connectors that a nozzle is configured to attach to, may vary and are not limited to that shown in FIGS. 3A and 3B.

This invention may be implemented with a wide variety of nozzle types. For example, FIGS. 4A, 4B, 4C and 4D show examples of different nozzle types, in illustrative implementations of this invention. Each of these FIGS. 4A, 4B, 4C and 4D), respectively, shows a type of nozzle that is attached to the extruder. Flow of material from each reservoir (e.g., 303, 333) may be actuated separately (either simultaneously or sequentially with flow from other reservoirs) in such a way that one or more materials are extruded through a single nozzle at a given time (FIG. 4A), are parallel-extruded (FIG. 4B), are coaxially extruded (FIG. 4C), or are mixed and then extruded (FIG. 4D).

Figure 4A:
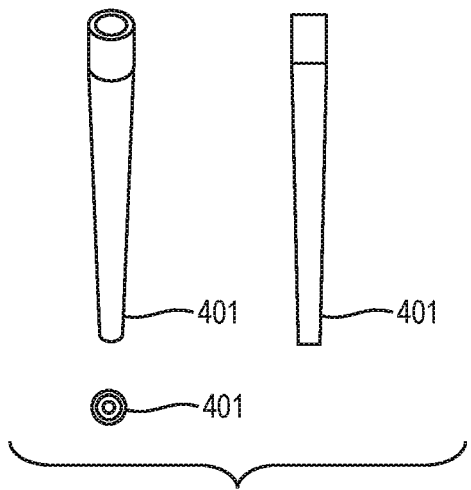
FIGS. 4A, 4B, 4C and 4D show different nozzle types.

In FIG. 4A, nozzle 401 is an example of a first type of nozzle, which extrudes a single material at a given instant of time. FIG. 4A shows perspective, cross-sectional and top views of nozzle 401.

Figure 4B:
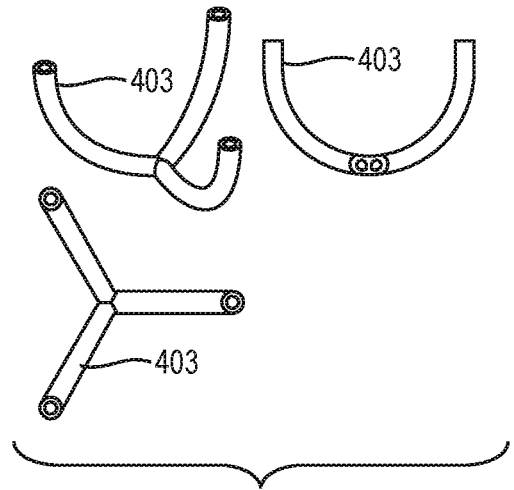

In FIG. 4B, nozzle 403 is an example of a second type of nozzle, which extrudes in parallel (e.g., extrudes a first column of a first material and simultaneously extrudes a second, parallel column of a second material). In many cases, the chamber of this second type of nozzle is short. FIG. 4B shows perspective, cross-sectional and top views of nozzle 403.

Figure 4C:
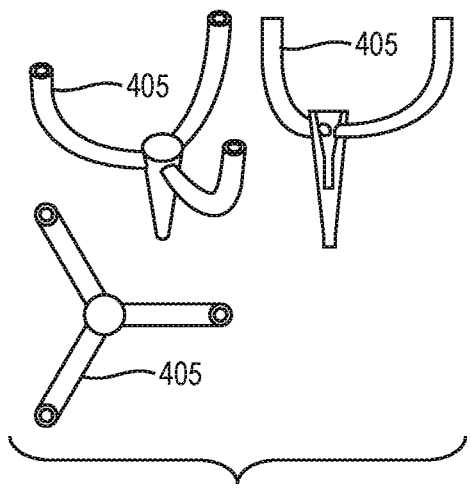
Figure 4D:
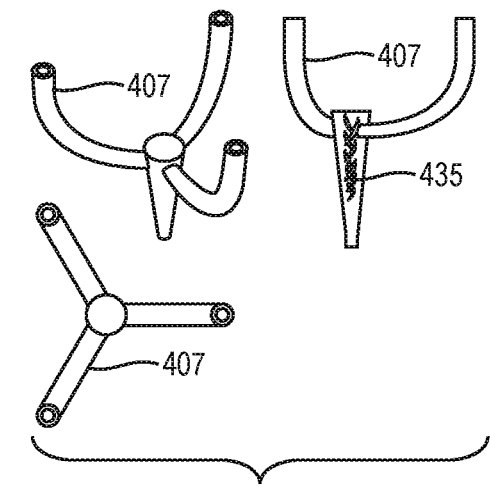

In FIG. 4C, nozzle 405 is an example of a third type of nozzle that simultaneously extrudes two different materials in a so-called "co-axial" pattern. In this "co-axial" pattern, an extruded object includes an inner core of a first material that is surrounded by an outer sheath of a second material. This third nozzle 405 includes a double chamber. FIG. 4C shows perspective, cross-sectional and top views of nozzle 405.

In FIG. 4D, nozzle 407 is an example of a fourth type of nozzle that mixes different materials from different reservoirs and then extrudes the mixture. For example, in some cases a screw 435 inside the nozzle mixes the materials. The screw is either static or moving relative to the rest of the nozzle. FIG. 4D shows perspective, cross-sectional and top views of nozzle 407.

In the examples shown in FIGS. 4A, 4B, 4C and 4D, the length and shape of the nozzles may vary. For example, the nozzles each have a bottom inner diameter. This bottom inner diameter may vary from nozzle to nozzle, even within a single type of nozzle, as appropriate for different viscosities of material extruded through the nozzle.

Figure 5A:
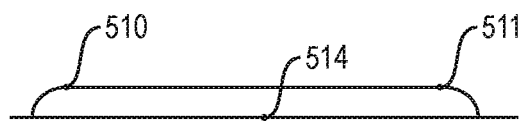
FIGS. 5A, 5B, 5C, 5D, 5E and 5F show examples of extrusion geometries.
Figure 5B:
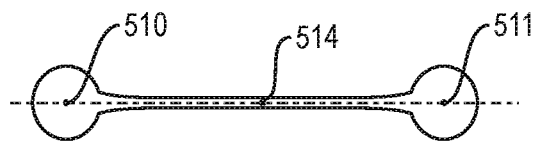
Figure 5C:
Figure 5D:
Figure 5E:
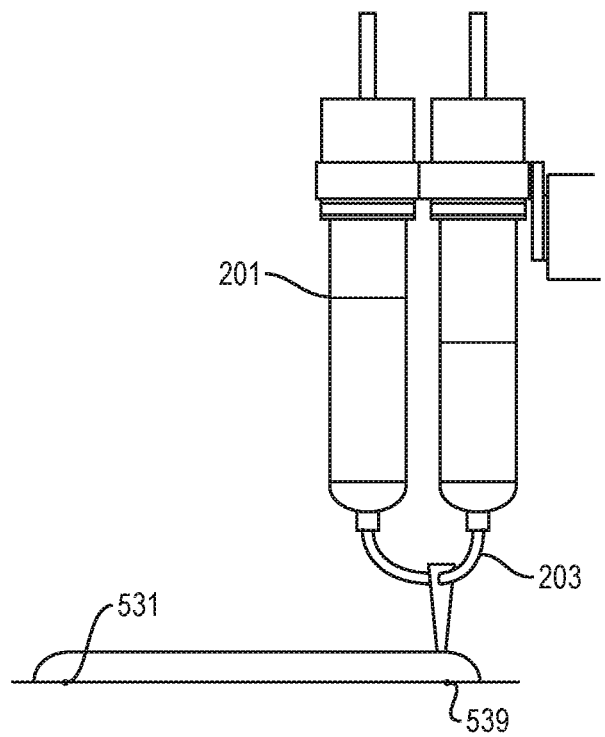
Figure 5F:
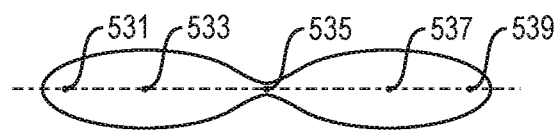

FIGS. 5A to 5F show examples of extrusion geometries, in an illustrative implementation of this invention. In FIGS. 5B, 5D and 5F, the dashed lines represent the deposition path traveled by the center of a nozzle of the extruder.

FIGS. 5A and 5B are a side view and a top view of a first extruded object. The first object is extruded during a single continuous extrusion. FIG. 5A shows that the first object has a constant height from point 510 to point 511. FIG. 5B shows that the first object has a variable width. As shown in FIG. 5B, the first object is wider at points 510 and 511 than at point 514. Thus, the width of the first object varies over the length of the first extruded object.

FIGS. 5C and 5D are a side view and a top view of a second extruded object. The second object is extruded during a single continuous extrusion. FIG. 5C shows that the second object has a variable height: the height increases from point 521 to point 522. FIG. 5D shows that the second object has a variable width: the width increases from point 521 to point 522. Thus, both the height and width of the second object varies over the length of the second object.

FIGS. 5E and 5F are a side view and a top view of a third extruded object. The third object is extruded during a single continuous extrusion. FIG. 5E shows that the third object has a constant height from point 531 to point 539. FIG. 5F shows that the third object has a variable width. As shown in FIG. 5F, the third object is wider at points 533 and 537 than at points 531, 535 and 539. Thus, the width of the third object varies over the length of the third object.

In illustrative implementations, increasing extrusion pressure tends to increase the rate of material flow through the extruder nozzle, and thus tends to increase the amount of material extruded in a given region of the toolpath, and thus (if the extruded material is sufficiently viscous) tends to increase both the height and width of the extruded object in that region.

Similarly, decreasing the nozzle speed tends to increase the amount of time that the extruder spends over a given region of the toolpath, and thus tends to increase the amount of material extruded in the region and thus (if the extruded material is sufficiently viscous) tends to increase both the height and width of the extruded object in that region.

The maximum height of an extruded object depends on, among other things, the viscosity of the material when extruded. The lower the viscosity, the lower the maximum possible height of a single extruded object.

Thus, in some cases (such as shown in FIGS. 5A, 5B, 5E and 5F), if the extruded material is less viscous, then increasing extrusion pressure or decreasing nozzle speed in a region of a toolpath tends to cause the extruded object to be wider in that region but not to be higher. The increased pressure or decreased speed increases the amount of material deposited in the region. Because of the lower viscosity, however, the additional material does not make the extruded object higher in the region, but instead makes the object wider in the region as the material spreads out.

In some implementations (e.g., FIGS. 5A-5F), vertical or horizontal thickness of an extruded object varies within a single extruded object. In some implementations, vertical or horizontal thickness of extruded objects (which objects adhere to each other to form a 3D fabricated article) vary from extruded object to extruded object. In some implementations, a user inputs an extrusion geometry, including a vertical or horizontal thickness of the extruded object. In some implementations, user-specified path instructions specify an extrusion geometry, including a vertical or horizontal thickness of the extruded object.

Figure 6:
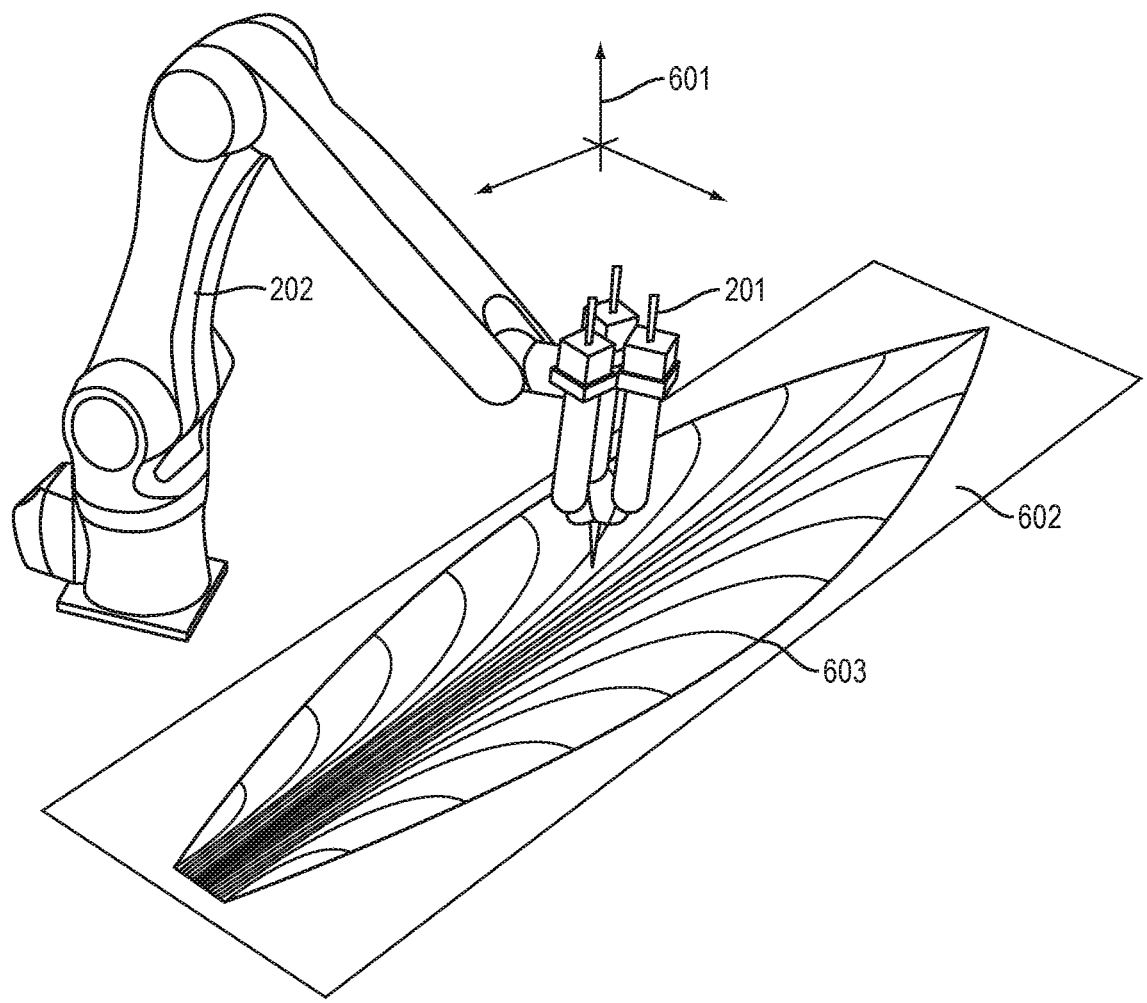
FIG. 6 shows an additive manufacturing system that is fabricating a 3D object.

FIG. 6 shows an additive manufacturing system fabricating a 3D object, in an illustrative implementation of this invention. In the example shown in FIG. 6, a robotic arm 202 moves an extruder 201 in three spatial dimensions 601. The extruder deposits multiple materials on top of a substrate 602 generating a functionally graded structure 603, depicted as a series of different thickness curves. The differentiation of the structure may be achieved by varying the properties of the multiple materials extruded, by varying the amount of material layers, or by extruding different geometries in height and width. The extruder may deposit material in such a way that material properties of the deposited material varies, as a function of spatial position within the deposited material, either continuously, discontinuously or discretely.

Figure 7:
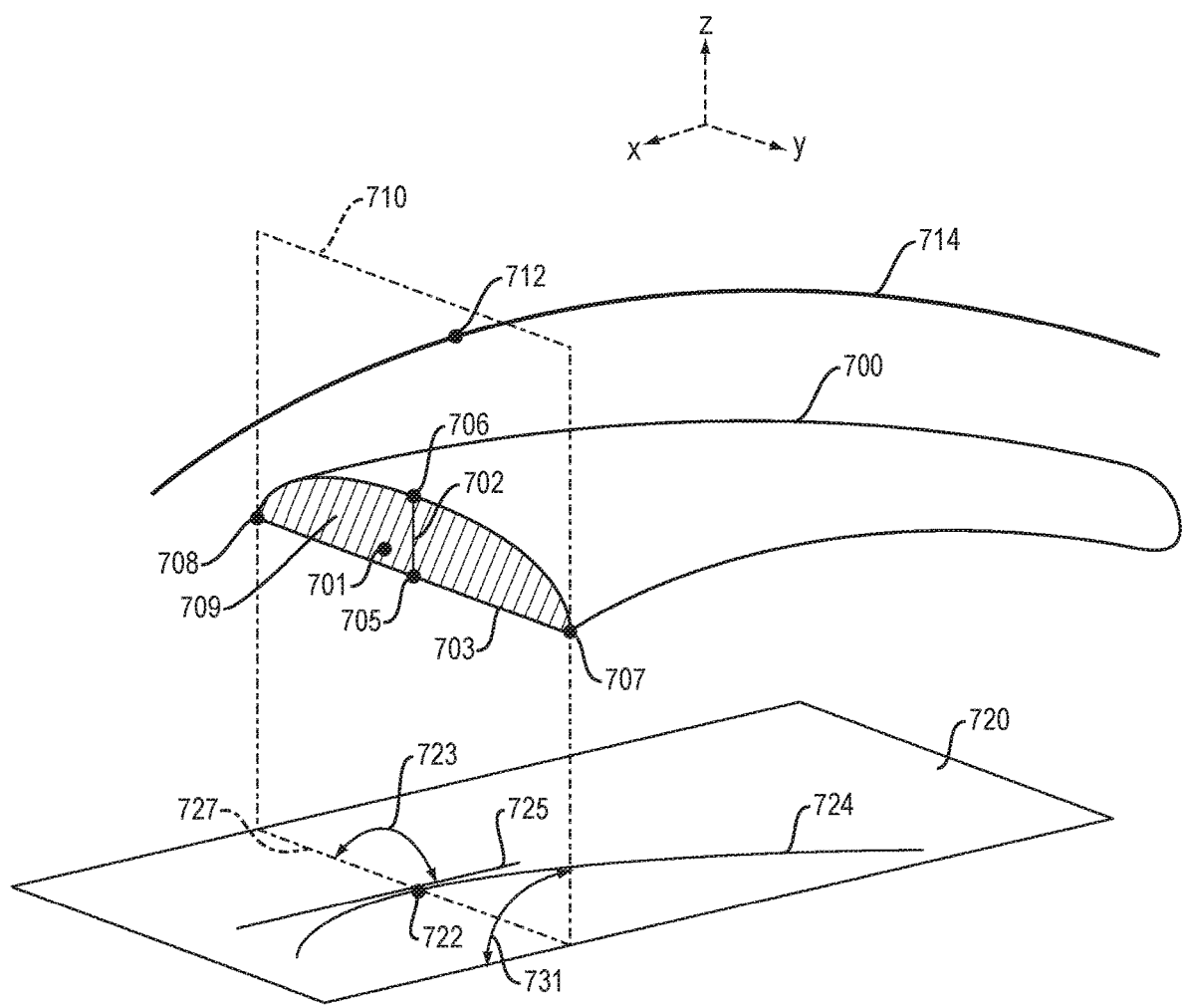
FIG. 7 shows an example of cross-sectional height and cross-sectional width of an extruded object.

FIG. 7 shows an example of cross-sectional height and cross-sectional width of an extruded object. In FIG. 7, the cross-sectional height of extruded object 700 at point 701 is the length of vertical line segment 702. In FIG. 7, the cross-sectional width of extruded object 700 at Point A (701) is the length of horizontal line segment 703. Vertical line segment 702 has endpoints at 705 and 706. Horizontal line segment 703 has endpoints at 707 and 708. In FIG. 7, vertical line segment 702 is the longest line segment with both endpoints in cross-sectional region 709; and horizontal line segment 703 is the longest line segment with both endpoints in cross-sectional region 709. In FIG. 7, cross-sectional region 709 is the intersection of a vertical plane 710 and the extruded object 700. Extrusion point 712 is a point on the deposition path 714 and is where the extruder was positioned when extruding the material now located at point A (701). Curve 724 is the orthographic projection of deposition path 714 onto horizontal plane 720. Point 722 is the orthographic projection of extrusion point 712 unto horizontal plane 720. Line 725 is tangent to curve 724 at point 722. The intersection of the horizontal plane 720 and vertical plane 710 lies in line 727. Vertical plane 710 is perpendicular to line 724. Angle 731 is a 90-degree angle between vertical plane 710 and horizontal plane 720. Angle 723 is the angle between line 725 and line 727.

In some implementations (e.g., FIGS. 5A-5F), cross-sectional height or cross-sectional width of an extruded object varies within a single extruded object. In some implementations, cross-sectional height or cross-sectional width of extruded objects (which objects adhere to each other to form a 3D fabricated article) vary from extruded object to extruded object. In some implementations, a user inputs an extrusion geometry, including a cross-sectional height or a cross-sectional width of the extruded object. In some implementations, user-specified path instructions specify an extrusion geometry, including a cross-sectional height or a cross-sectional width of the extruded object.

Figure 8A:
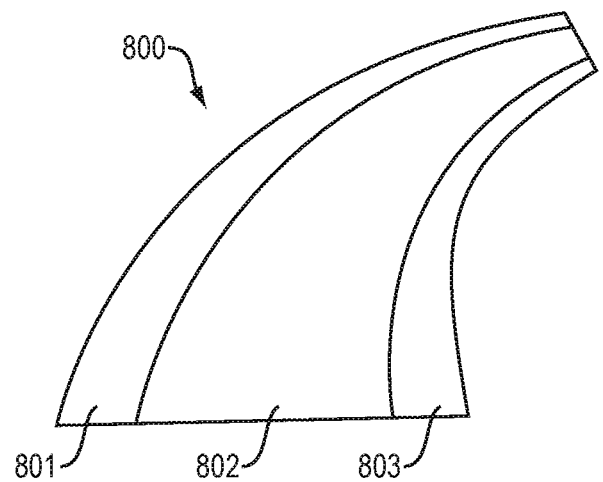
FIG. 8A and FIG. 8B are a top view and perspective view, respectively, of multiple extruded objects that adhere together to form a 3D fabricated object.
Figure 8B:
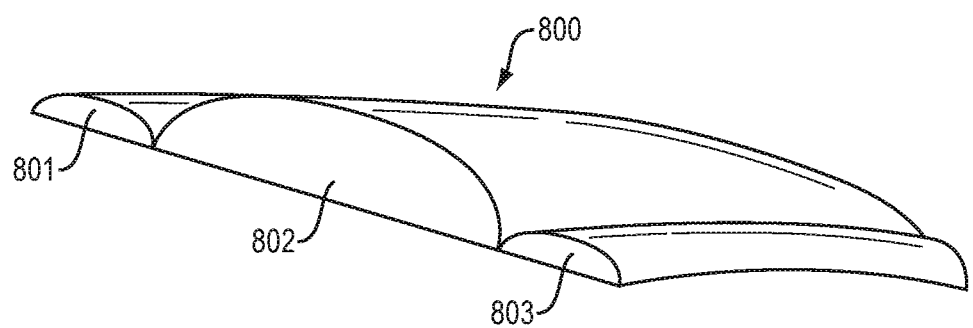

FIG. 8A and FIG. 8B are a top view and perspective view, respectively, of multiple extruded objects that adhere together to form a 3D fabricated object, in an illustrative implementation of this invention. Three extruded objects 801, 802, 803 were extruded in three deposition paths, one object per path. In the example shown in FIGS. 8A and 8B: (a) extruded object 801 was extruded only while the extruder was moving in a first deposition path; (b) extruded object 802 was extruded only while the extruder was moving in a second deposition path; and (c) extruded object 803 was extruded only while the extruder was moving in a third deposition path (the first, second and third deposition paths being different from each other and not intersecting). After being extruded, extruded objects 801, 802, 803 adhered to each other. Specifically, object 801 adhered to object 802; and object 802 adhered to object 803, in such a way that the three objects together formed an integral (unitary) 3D fabricated object 800.

In some implementations, a water-based digital fabrication (WDF) platform pneumatically extrudes materials and precisely positions a nozzle in space. In the WDF platform, a robotic interface may distribute serial-based signals and valve response delays to inform the custom extrusion system. Simultaneously, an Ethernet-enabled data stream may locate feedback for the existing robotic arm.

In some cases, in the WDF platform, a 6-axis robotic arm is used as a positioning platform, and a multi-barrel pneumatic extruder is used as a deposition platform. The robotic arm may cover curved areas with specific wrist motions while conserving orthogonal positioning to the substrate.

In some cases, before being extruded by a WTF platform, the biomaterials comprise a wet, off-white, clay-like mass. The biomaterials may be packed into cartridges that are loaded into a holster within a rotating, multi-material end-effector. A nozzle diameter may be chosen in relation to the viscosity and cohesive forces within the material. Subsequently, air pressure, the distance of the nozzle from the substrate, and the speed of the robotic arm may be selected. Each of these parameters may be also informed by the resolution and turning radii of the toolpath geometry. Following extrusion, the material may be left to dry at room temperature.

Parametric Fabrication

Figure 9:
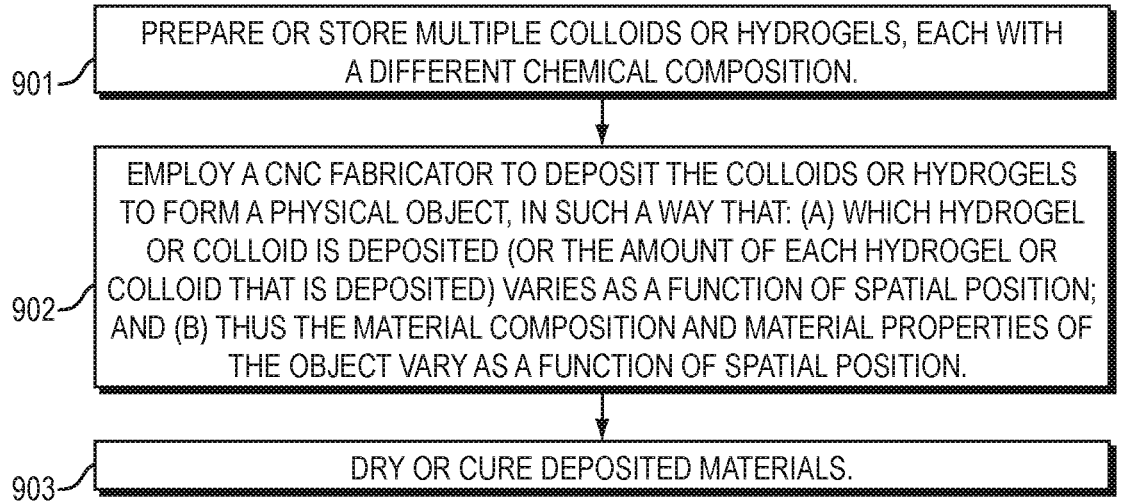
FIGS. 9 and 10 are flowcharts that show examples of parametric fabrication.
Figure 10:
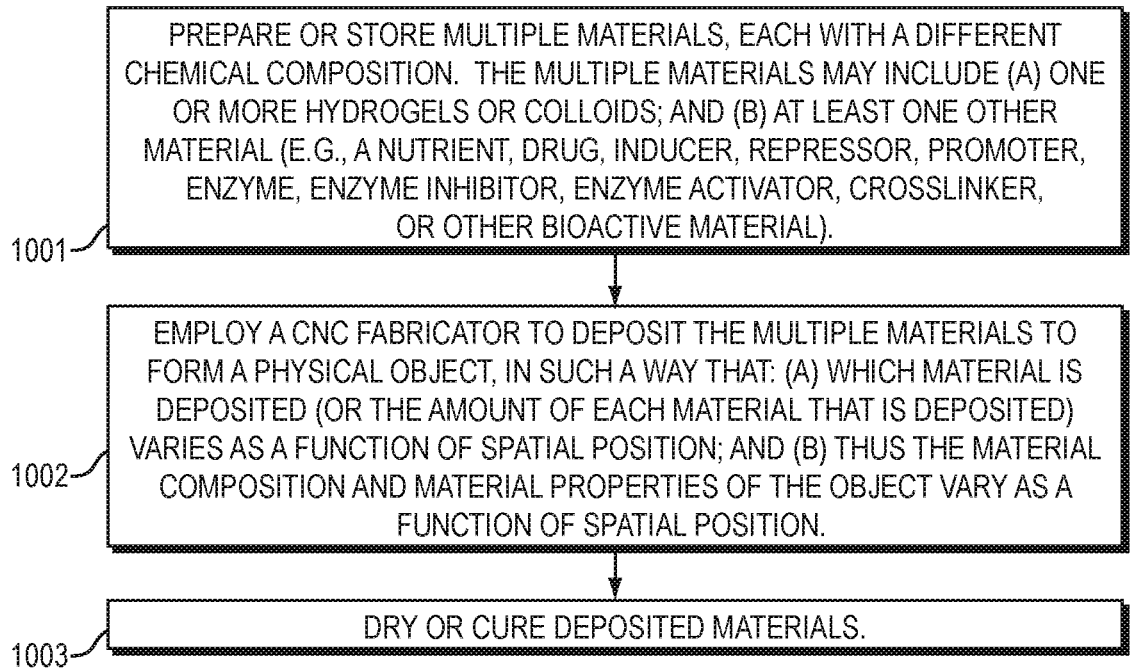

FIGS. 9 and 10 are flowcharts that show examples of parametric fabrication.

The method shown in FIG. 9 includes the following steps: Prepare or store multiple colloids or hydrogels, each with a different chemical composition (Step 901). Employ a CNC fabricator to deposit the colloids or hydrogels to form a physical object, in such a way that: (a) which hydrogel or colloid is deposited (or the amount of each hydrogel or colloid that is deposited) varies as a function of spatial position; and (b) thus the material composition and material properties of the object vary as a function of spatial position (Step 902). Dry or cure deposited materials (Step 903).

In the example shown in FIG. 10, nutrients or other bioactive materials are embedded in the structure being fabricated. The method shown in FIG. 10 includes the following steps: Prepare or store multiple materials, each with a different chemical composition. The multiple materials may include (a) one or more hydrogels or colloids; and (b) at least one other material (e.g., a nutrient, drug, inducer, repressor, promoter, enzyme, enzyme inhibitor, enzyme activator, crosslinker, or other bioactive material) (Step 1001). Employ a CNC fabricator to deposit the multiple materials to form a physical object, in such a way that: (a) which material is deposited (or the amount of each material that is deposited) varies as a function of spatial position; and (b) thus the material composition and material properties of the object vary as a function of spatial position (Step 1002). Dry or cure deposited materials (Step 1003).

Hydrogels and Colloids

In some implementations of this invention, multiple colloids or hydrogels (e.g., biopolymers) are extruded to fabricate a structure that varies in material properties in different spatial positions in the structure.

In some cases, at least one of the extruded materials is a hydrogel with a high proportion of cellulose (40%-70% v/v), methylcellulose, or sodium carboxymethylcellulose. The high proportion of cellulose may provide the hydrogel with additional mechanical strength; likely due to the distributing of cellulose fibers contributing to an increase in anisotropy as well as an interweaving of chitosan and cellulose chains. Adding cellulose may turn a mixture into a more viscous, quick-drying hydrogel. Material tests of intricate geometry printed with this mixture show little-to-no spreading on the substrate. In some cases, the hydrogel is squeezed through a ~1.0 mm nozzle with 40-90 psi of air pressure, resulting in an ability to print at a higher resolution. Increasing the amount of cellulose relative to the amount of chitosan may result in a whiter, slightly translucent material. Conversely, the speed at which the robotic arm is programmed to move may decrease with increasing amounts of cellulose; because the printed geometries stick together so well such that turning corners and making curves drag the material out of place.

In some cases, at least one of the extruded materials is a hydrogel with a high proportion of chitosan (3%-15% w/v). The high proportion of chitosan may result in increases in both strength and elasticity. A high ratio of chitosan relative to cellulose and starch may make the material more golden brown in color and opaque.

In some cases, at least one of the extruded materials is a hydrogel with a high proportion of calcium carbonate (1%-10% w/v). This high proportion of calcium carbonate may yield a lighter weight material with: the same, or an even better, tensile strength; a whiter, more translucent color; faster drying time; more surface roughness; and added stiffness. The hydrogel may become much lighter and may hold its shape very well. This may allow for a high printing resolution (e.g., ~1.0 mm), but may necessitate a slower printing speed and more air pressure (e.g., 40-90 psi). Adding calcium carbonate may also result in a higher pH (6-7.4), which may create a more hospitable environment for bacteria and other organisms.

In some cases, at least one of the extruded materials is a hydrogel with a high proportion of cornstarch (4%-10% w/v). This high proportion of cornstarch may result in added stiffness as well as a whiter color and slightly more translucency.

In some cases, the concentration of calcium carbonate has a strong effect on both the strength and stiffness of the material. In some cases, a higher ultimate tensile strength in materials occurs with greater concentrations of chitosan; whereas, in some cases, increased stiffness is largely attributable to higher concentrations of starch. Alternatively, higher concentrations of cellulose may add both strength and a higher elastic modulus to a composite; most likely due to its fibrous structure.

In some cases, a bio-cement is cross-linked with acetic acid to form a hydrogel, which is left to dry at room temperature after being deposited in 2.5- or 3-dimensions via a water-based digital fabrication system.

In some cases, each composite that is extruded in the fabrication process comprises a mixture of environmentally abundant, widely available organic and inorganic compounds involved in organic waste streams. For instance, in some cases, each composite that is extruded in the fabrication comprises a different combination of two or more of the following: apple pectin, sodium alginate, casein, chitosan, methylcellulose, sodium carboxymethylcellulose, microcrystalline cellulose, cellulose nanoparticles, elastin, calcium carbonate, calcium chloride, calcium phosphate, activated carbon, carbon nanotubes, laterite clay, agar, gelatin, collagen, keratin, connectin (titin), extensin, fibronectin, silk fibroin, cornstarch, sucrose, trehalose, glucose, sorbitol, xanthin gum, arrowroot, gum arabic, cinnamon powder, turmeric, beet root extract, red cabbage extract, cyanidin-3-O-β-glucoside, cyanidin-3-diglucoside-5-glucoside, cyanic-lin, peonidin, pelargonidin, delphinidin, malvidin, petunic-lin, and melanin. The different composites may differ from each other in terms of their ingredients or the relative proportions of their ingredients.

In some cases, multiple materials (e.g., colloids or hydrogels) are deposited to form an object, but the proportion of materials that are deposited varies in different locations in the object. Each of the different compositions that are deposited may have different material properties (such as surface roughness, surface energy, hydrophilicity, tilt angle, and hysteresis). These material properties may, in turn, may affect how much water or moisture the composite takes up (e.g., from the atmosphere).

In some cases, by varying the relative amounts of the materials that are deposited at different positions in an object being fabricated, various nutrients, growth factors, antibodies, and enzymes may also be immobilized, localized, and stabilized. These proteins may be released in increments over a period of time and may help support living organisms that can augment these materials in useful ways, in response to environmental conditions.

In some implementations, compounds are sequentially dissolved in water by hand-mixing or blending with a commercial blender or torque bit. The pH of the resulting colloids may be adjusted using bases such as sodium hydroxide, potassium hydroxide, and calcium hydroxide, as well as acids including acetic acid, citric acid, lactic acid, oxalic acid, and uric acid. The temperature of the mixture may be tuned at each step using a hot plate and magnetic stirrer or oven.

In some cases, the resulting colloids or hydrogels are printed with a Water-based Digital Fabrication Platform (WDFP) or cast into plastic petri dishes to test the effects of toolpath direction (isotropy vs. anisotropy) on hydrophilicity and surface roughness. To print, gels may be loaded into plastic, metal, or Teflon™ cartridges, topped with a piston, and capped, after which they are affixed into the robotic WDFP. Air pressure tubing may attach to the cartridge cap to pneumatically push the material through metal nozzles with different diameters. The printed and cast gels may dry at room temperature, until a thin film is formed.

The amount of water a material takes up may be determined by many physical and chemical properties. First, water may land on and stay on a material. How much water stays on a material (after landing on it) may depend on electrochemical attraction to water in the air as well as how much friction and capillary forces result from the surface roughness to immobilize the water. Second, the water may either be absorbed into the material, permeate through pores and microtears, evaporate back into air, or, depending on the tilt angle, slip away. Whether the water absorbs, permeates or evaporates may in turn be affected by the hydrophilicity, surface energy, and hysteresis of the material. The contact angle (of a water droplet on the material) is indicative of the material's hydrophilicity.

Surface Roughness: In some implementations: (a) multiple materials are extruded to fabricate an object; and (b) at least one of the materials has chemical and physical properties that, when dried within a colloid or hydrogel, imbues the resulting film with varying degrees of a smooth or rough surface.

In some cases, having a rougher surface is beneficial because once water is adsorbed onto a surface, a rougher surface increases the friction coefficient and capillary forces, and thereby makes it easier for the surface to retain and take up water.

In some implementations of this invention, a composition with a very high surface roughness is produced by mixing, with water, 29% pectin w/v, 8% calcium caseinate w/v, 5% glycerin v/v, and 1% sodium hydroxide v/v. For this composition, the maximum feature size—as confirmed by AFM (atomic force microscopy)—is ~20 μm, with a spacing of ~5 μm. However, this composition has a contact angle of 68 degrees, indicating that it is less hydrophilic than many others.

In some implementations, a composition with a very smooth surface is produced by mixing, with water, 35% pectin w/v, 2% alginate w/v, and 5% glycerin v/v. For this composition, the maximum feature height—as confirmed via AFM—is ~0.4 μm.

Hydrophilicity: In some cases, having a very hydrophilic surface is beneficial. This is because once water is adsorbed onto a surface, a hydrophilic material may have greater wettability (and greater total contact area between the material and the water), and thereby may have greater ability to retain and take up water.

In some cases, a composition that is both very hydrophilic and very smooth is produced by mixing, with water, 35% pectin w/v, 5% glycerin v/v. For this composition, the average contact angle at room temperature and ambient humidity is 32 degrees. This means that less total water is adsorbed onto this material from the environment, but the water that is immobilized is readily taken up.

FIGS. 11A, 11B, 11, 11D, 11E, 11F, 11G and 12 are each a flowchart for a method of producing a colloid or hydrogel.

Figure 11A:
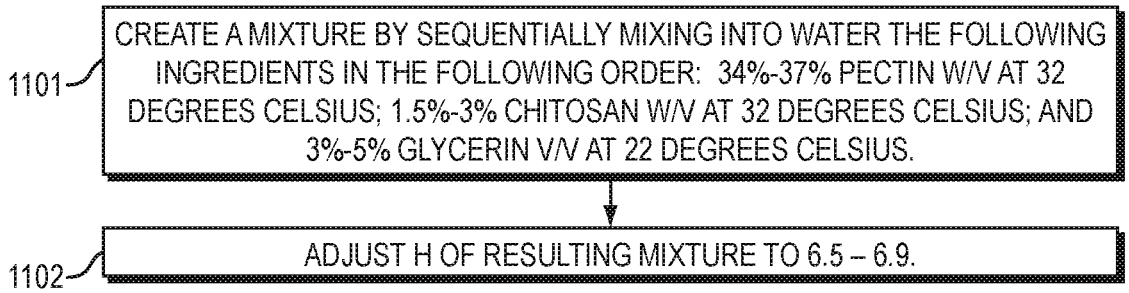
FIGS. 11A, 11B, 11C, 11D, 11E, 11F, 11G, and 12 are each a flowchart for a method of producing a colloid or hydrogel.

The method, shown in FIG. 11A, includes the following steps: Create a mixture by sequentially mixing into water the following ingredients in the following order: 34%-37% pectin w/v at 32 degrees Celsius; 1.5%-3% chitosan w/v at 32 degrees Celsius; and 3%-5% glycerin v/v at 22 degrees Celsius (Step 1101). Adjust pH of resulting mixture to 6.5-6.9 (Step 1102).

Figure 11B:
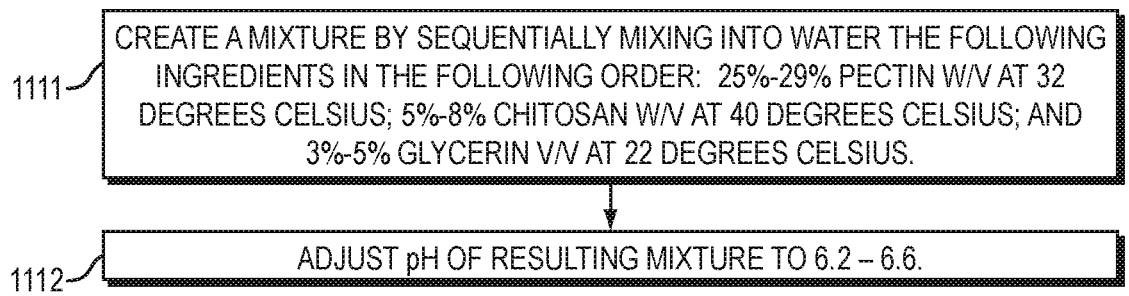

The method shown in FIG. 11B includes the following steps: Create a mixture by sequentially mixing into water the following ingredients in the following order: 25%-29% pectin w/v at 32 degrees Celsius; 5%-8% chitosan w/v at 40 degrees Celsius; and 3%-5% glycerin v/v at 22 degrees Celsius (Step 1111). Adjust pH of resulting mixture to 6.2-6.6 (Step 1112).

Figure 11C:
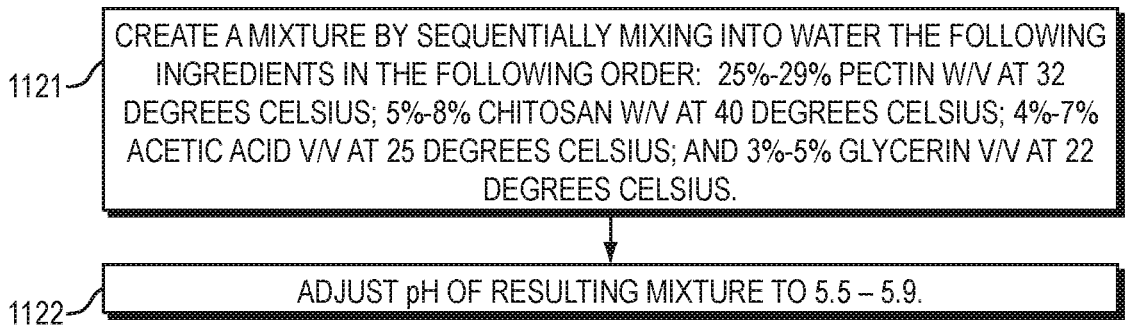

The method shown in FIG. 11C includes the following steps: Create a mixture by sequentially mixing into water the following ingredients in the following order: 25%-29% pectin w/v at 32 degrees Celsius; 5%-8% chitosan w/v at 40 degrees Celsius; 4%-7% acetic acid v/v at 25 degrees Celsius; and 3%-5% glycerin v/v at 22 degrees Celsius (Step 1121). Adjust pH of resulting mixture to 5.5-5.9 (Step 1122).

Figure 11D:
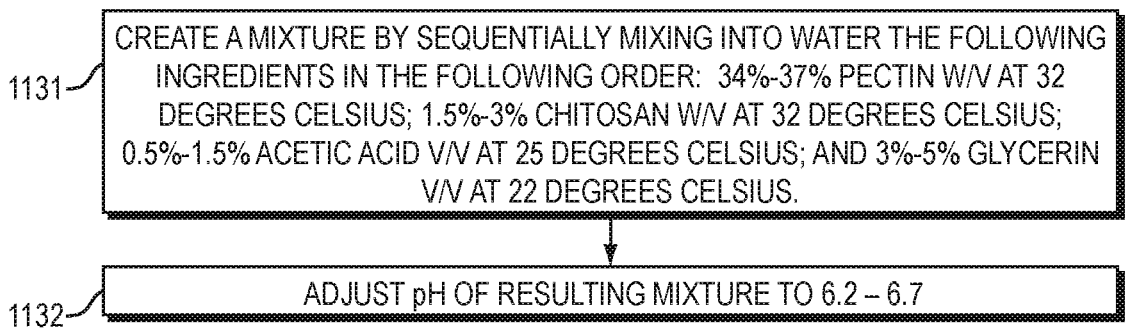

The method shown in FIG. 11D includes the following steps: Create a mixture by sequentially mixing into water the following ingredients in the following order: 34%-37% pectin w/v at 32 degrees Celsius; 1.5%-3% chitosan w/v at 32 degrees Celsius; 0.5%-1.5% acetic acid v/v at 25 degrees Celsius; and 3%-5% glycerin v/v at 22 degrees Celsius (Step 1131). Adjust pH of resulting mixture to 6.2-6.7 (Step 1132).

Figure 11E:
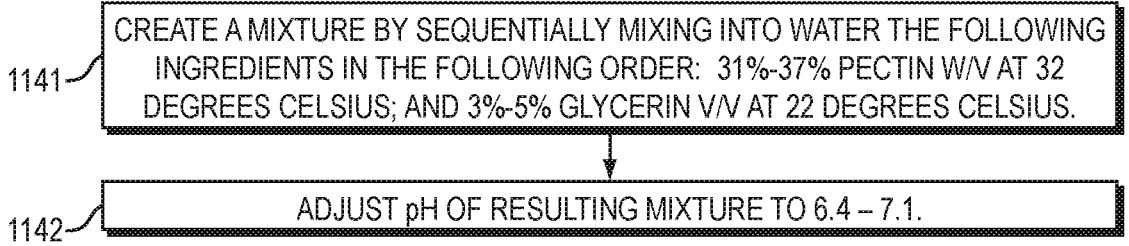

The method shown in FIG. 11E includes the following steps: Create a mixture by sequentially mixing into water the following ingredients in the following order: 31%-37% pectin w/v at 32 degrees Celsius; and 3%-5% glycerin v/v at 22 degrees Celsius (Step 1141). Adjust pH of resulting mixture to 6.4-7.1 (Step 1142).

Figure 11F:
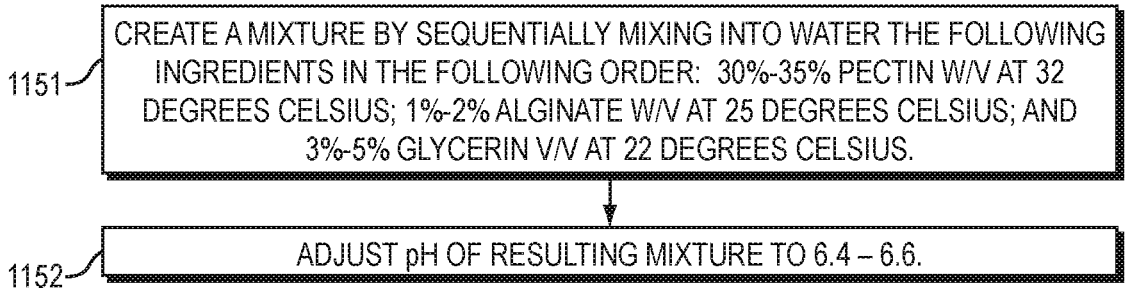

The method shown in FIG. 11F includes the following steps: Create a mixture by sequentially mixing into water the following ingredients in the following order: 30%-35% pectin w/v at 32 degrees Celsius; 1%-2% alginate w/v at 25 degrees Celsius; and 3%-5% glycerin v/v at 22 degrees Celsius (Step 1151). Adjust pH of resulting mixture to 6.4-6.6 (Step 1152).

Figure 11G:
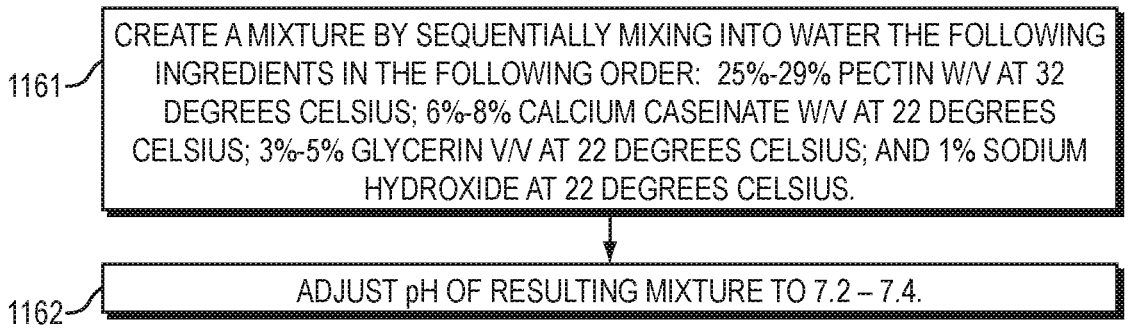

The method shown in FIG. 11G includes the following steps: Create a mixture by sequentially mixing into water the following ingredients in the following order: 25%-29% pectin w/v at 32 degrees Celsius; 6%-8% calcium caseinate w/v at 22 degrees Celsius; 3%-5% glycerin v/v at 22 degrees Celsius; and 1% sodium hydroxide (Step 1161) at 22 degrees Celsius. Adjust pH of resulting mixture to 7.2-7.4 (Step 1162).

As used herein (e.g., in FIGS. 11A-11G), each phrase of the form "x %-y %" refers to a range of percentages, which range consists of percentages that are greater than or equal to x % and less than or equal to y %. For example, "3%-5%" refers to a range of percentages, which range consists of percentages that are greater than or equal to 3% and less than or equal to 5%. Unless the context clearly indicates otherwise, each description of values as "x-y", where x is smaller than y, refers to a range of values, which range consists of values that are greater than or equal to x and less than or equal to y. For example, a pH of "6.4-6.6" means a pH in a range, which range consists of pH's that are greater than or equal to 6.4 and less than or equal to 6.6.

The following eight paragraphs describe: (a) five tests that were performed on biopolymer films that were produced by the methods shown in FIGS. 11A, 11B, 11C, 11D, 11E, 11F and 11G respectively; and (b) results of these five tests.

In each of these five tests: (a) a mixture was created (by mixing pectin and other materials with water); (b) a first portion of the mixture was cast in a petri dish and a second portion of the mixture was printed with a water-based CNC deposition system; (c) both the first and second portions of the mixture dried under a fume hood for two weeks, at room temperature, resulting in each case in a biopolymer film; and (d) material properties of the biopolymer films were measured.

In the following description of test results, certain parameters are sometimes described in the following format: X/Y, where (a) X is the value of the parameter as measured for a top surface of the biopolymer film that was exposed to air during drying (and thus is rougher); and Y is the value of the parameter as measured for a smooth bottom surface of the biopolymer film that was printed against a smooth surface or cast against a petri dish. Specifically, the parameters that are described in this format are contact angle (indicative of hydrophilicity), hysteresis, tilt angle, surface energy, and surface roughness. For instance, if contact angle is described as 54.478/31.667 degrees for a biopolymer film, this means that: (a) the contact angle is 54.478 degrees for a top surface of the biopolymer film that was exposed to air during drying (and thus is rougher); and is 31.667 degrees for a smooth bottom surface of the biopolymer film that was printed against a smooth surface or cast against a petri dish.

In these five tests, contact angle is indicative of hydrophilicity. The smaller the contact angle for a drop of a material, the more hydrophilic the material is. Likewise, the greater the contact angle for a drop of a material, the more hydrophobic the material is. In these five tests, hysteresis is the difference, measured in degrees, between the advancing and receding contact angle of a water droplet on a surface. Static hysteresis is purely a result of the surface beneath the droplet, while the dynamic hysteresis—i.e., when a material is pummeled with droplets as it is tilted from 0-90 degrees—is also related to the overall water soaked up by the material. Thus, hysteresis may be an indicator of the total amount of water that is able to be immobilized on the surface of a material, due to surface roughness, friction, and capillary action. In some cases, the greater the hysteresis, the greater the total amount of water that may be immobilized on the surface of a material.

First Test: In a test of the method shown in FIG. 11A, a mixture was created by sequentially mixing into water the following materials in the following order: 35% pectin w/v; 2% chitosan w/v; and 5% glycerin v/v. After drying, the resulting biopolymer film had the following material properties: (a) a surface roughness (average feature height) of 37 microns; (b) contact angle of 60.889/39.772 degrees; (c) hysteresis of 2.12/5.78 degrees; (d) tilt angle of 37/21 degrees; (e) surface energy of −0.4/0.5 mJ/m$^2$; and (f) pH of 6.9.

Second Test: In a test of the method shown in FIG. 11B, a mixture was created by sequentially mixing into water the following materials in the following order: 29% pectin w/v; 8% chitosan w/v; and 5% glycerin v/v. After drying, the resulting biopolymer film had the following material properties: (a) surface roughness (average feature height) of 43 microns; (b) contact angle of 72.200/27.967 degrees; (c) hysteresis of 2.41/7.78 degrees; (d) tilt angle of 42/14 degrees; (e) surface energy of −0.6/0.7 mJ/m$^2$; and (f) pH of 6.2.

Third Test: In a test of the method shown in FIG. 11C, a mixture was created by sequentially mixing into water the following materials in the following order: 29% pectin w/v; 8% chitosan w/v; 5% acetic acid v/v; and 5% glycerin v/v. After drying, the resulting biopolymer film had the following material properties: (a) surface roughness (average feature height) of 48 microns; (b) contact angle of 75.900/49.356 degrees; (c) hysteresis of 1.32/3.20 degrees; (d) tilt angle of 46/23 degrees; (e) surface energy of −0.7/−0.1 mJ/m$^2$; and (f) pH of 5.5.

Fourth Test: In a test of the method shown in FIG. 11D, a mixture was created by sequentially mixing into water the following materials in the following order: 35% pectin w/v; 2% chitosan w/v; 1% acetic acid v/v; and 5% glycerin v/v. After drying, the resulting biopolymer film had the following material properties: (a) surface roughness (average feature height) of 29 microns; (b) contact angle of 54.478/31.667 degrees; (c) hysteresis of 4.48/6.15 degrees; (d) tilt angle of 35/17 degrees; (e) surface energy of −0.3/0.3 mJ/m$^2$; and (f) pH of 6.7.

Fifth Test: In a test of the method shown in FIG. 11E, a mixture was created by sequentially mixing into water the following materials in the following order: 35% pectin w/v; and 5% glycerin v/v. After drying, the resulting biopolymer film had the following material properties: (a) surface roughness (average feature height) of 12 microns; (b) contact angle of 31.678/40.833 degrees; (c) hysteresis of 10.15/12.22 degrees; (d) tilt angle of 19/22 degrees; (e) surface energy of 0.5/0.1 mJ/m$^2$; and (f) pH of 7.1.

Figure 12:
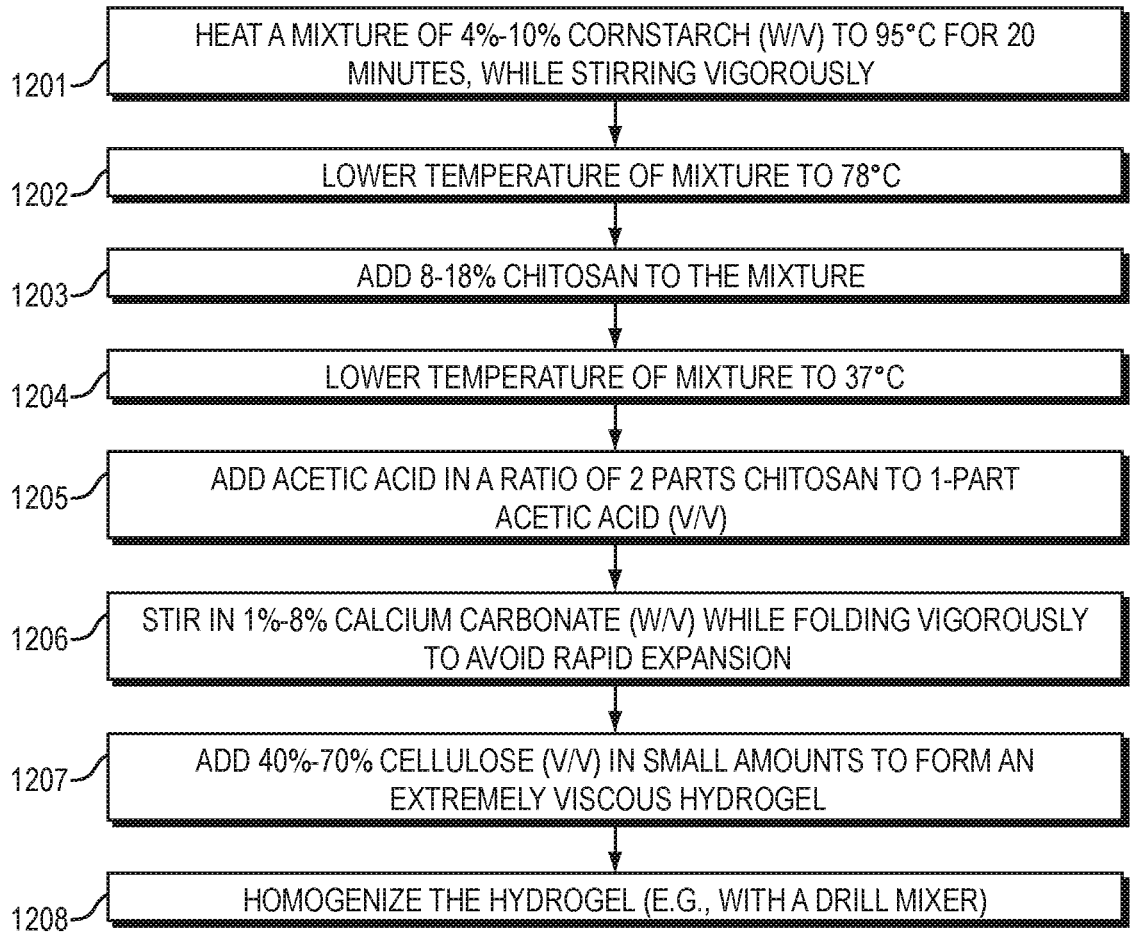

The method shown in FIG. 12 includes the following steps: Heat a mixture of 4%-10% cornstarch w/v to 95° C. for 20 minutes, while stirring vigorously (Step 1201). Lower temperature of mixture to 78° C. (Step 1202). Add 8%-18% chitosan to the mixture (Step 1203). Lower temperature of mixture to 37° C. (Step 1204). Add acetic acid in a ratio of 2 parts chitosan to 1-part acetic acid v/v (Step 1205). Stir in 1%-8% calcium carbonate w/v while folding vigorously to avoid rapid expansion (Step 1206). Add 40%-70% cellulose v/v in small amounts to form an extremely viscous hydrogel (Step 1207). Homogenize the hydrogel (e.g., with a drill mixer) (Step 1208).

Figure 13:
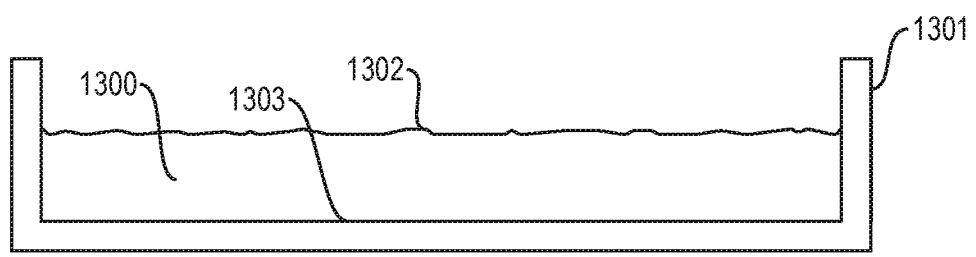
FIG. 13 illustrates a cross-sectional view of a mixture (e.g., colloid or hydrogel) that has been cast in petri dish.

FIG. 13 illustrates a cross-sectional view of a mixture (e.g., hydrogel) 1300 that has been cast in petri dish 1301. The mixture 1300 has a rough, upper side 1302 that is exposed to air while drying. The mixture 1300 also has a smooth lower side 1303 that is cast against a surface of the petri dish.

Figure 14A:
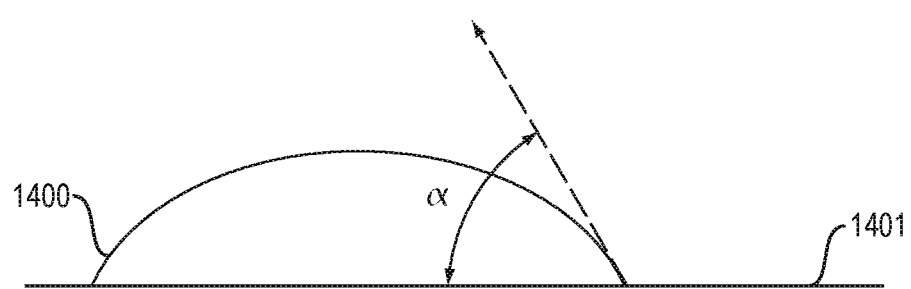
FIG. 14A illustrates a contact angle.

FIG. 14A illustrates a contact angle. Recall that the smaller the contact angle for a material, the more hydrophilic the material is. In FIG. 14A, drop 1400 has a contact angle α with a surface 1401, while surface 1401 is in a horizontal position.

Figure 14B:
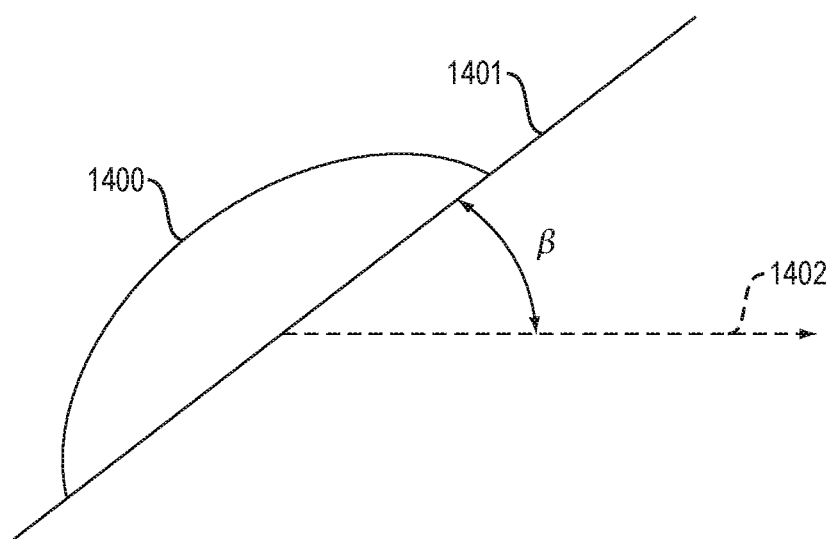
FIG. 14B illustrates a tilt angle.

FIG. 14B illustrates a tilt angle. In FIG. 14B, surface 1401 has been tilted at an angle β (relative to horizontal plane 1402). In FIG. 14B, angle β is the tilt angle—i.e., the smallest angle at which drop 1400 will slide down surface 1401.

Figure 14C:
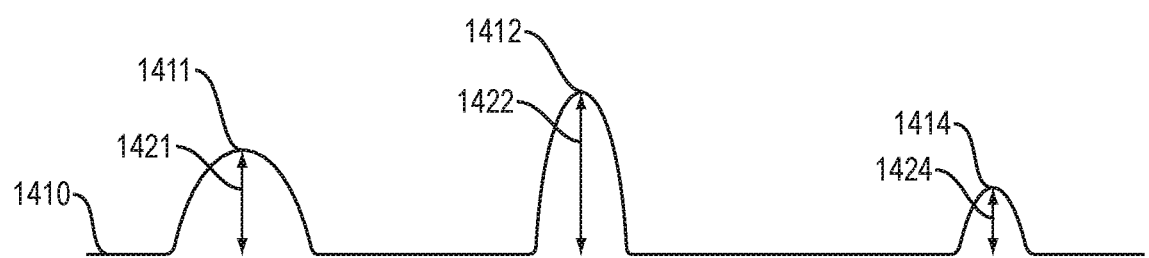
FIG. 14C illustrates surface roughness.

FIG. 14C illustrates surface roughness. In FIG. 14C, a surface 1410 includes raised features (e.g., 1411, 1412, 1414) that have feature heights (e.g., 1421, 1422, 1424). The average feature height of surface 1410 is the surface roughness of the surface 1410. FIG. 14C shows only three raised features. In practice, the number of raised features of a surface may be much larger than that.

Applications/Use Scenarios

This invention has many practical applications, such as for fabricating tissue scaffolds or fabricating food packaging.

Figure 15:
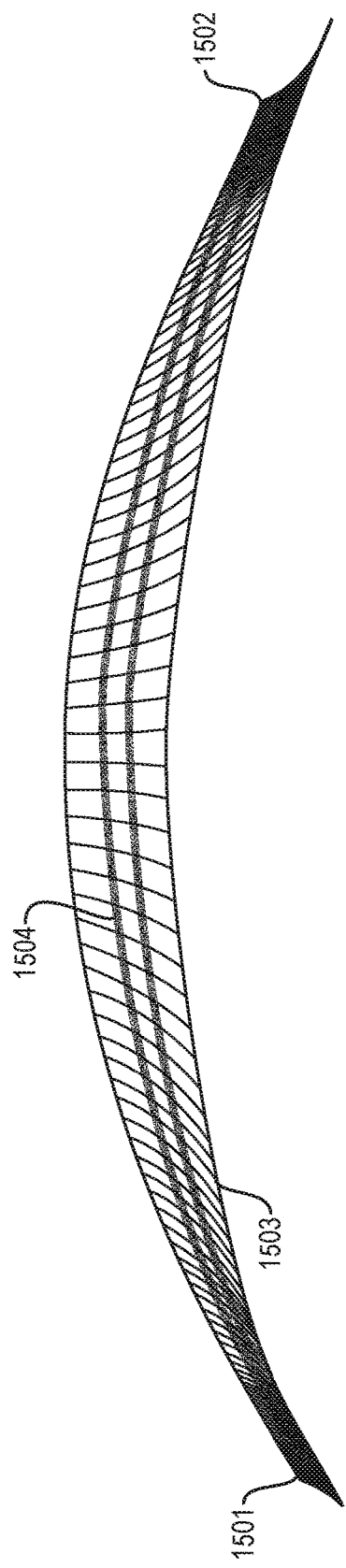
FIGS. 15 and 16 show examples of structures made by parametric fabrication.
Figure 16:
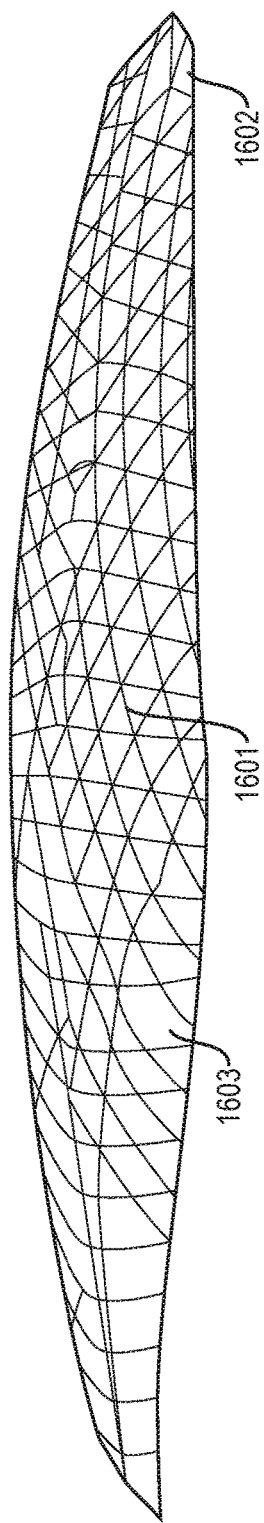

FIGS. 15 and 16 show examples of structures made by parametric fabrication.

In FIG. 15, material stiffness of a fabricated object varies as a function of spatial position. In FIG. 15, materials in the fabricated structure are stiffest at ends 1501 and 1502, medium stiff at position 1503, and least stiff (most flexible) at position 1504.

In FIG. 16, the fabricated structure includes larger ribs (e.g., 1601), regions with a smaller lattice structure (e.g., 1603), and rigid outer contours (e.g., 1602).

Computers

In exemplary implementations of this invention, one or more electronic computers (e.g. 110, 126, 134) are programmed and specially adapted: (1) to control the operation of, or interface with, hardware components of an additive manufacturing apparatus, including a motion system, an extruder, and user interface hardware; (2) to calculate extrusion pressure or nozzle speed for achieving a given extrusion geometry; (3) to generate fabrication instructions based, at least in part, on user-inputted path (or tool) instructions and on pressure or nozzle speed; (4) to control or interface with hardware for displaying a user interface and for receiving user input; (5) to receive signals indicative of human input, including input specifying deposition paths, extrusion geometries, material properties and system parameters; (6) to output signals for controlling transducers for outputting information in human perceivable format; and (7) to process data, to perform computations, to execute any algorithm or software, and to control the read or write of data to and from memory devices tasks 1-7 of this sentence referred to herein as the "Computer Tasks"). The one or more computers may, in some cases, communicate with each other or with other devices: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied herein. For example, in some cases, instructions encoded in a tangible, non-transitory, computer-accessible medium comprise instructions for a computer to perform the Computer Tasks.

Network Communication

In illustrative implementations of this invention, an electronic device (e.g., 110, 111, 112, 113, 114, 115, 116, 126, 134) is configured for wireless or wired communication with other electronic devices in a network.

For example, in some cases, a computer 110 and I/O device 111 each include (or interface with) a wireless communication module for wireless communication with other electronic devices in a network. Each wireless communication module (e.g., 117, 118) may include (a) one or more antennas, (b) one or more wireless transceivers, transmitters or receivers, and (c) signal processing circuitry. The wireless communication module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, computer port, cables or wiring.

In some cases, one or more computers (e.g., 110, 126, 134) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), or wireless communication standard, including IEEE 802.11 (Wi-Fi®), IEEE 802.15 (Bluetooth®/Zigbee®), IEEE 802.16, IEEE 802.20, GSM (global system for mobile communications), UMTS (universal mobile telecommunication system), CDMA (code division multiple access, including IS-95, IS-2000, and WCDMA), LTE (long term evolution), or 5G (e.g., ITU IMT-2020).

I/O Devices

In illustrative implementations, an additive manufacturing system includes, or interfaces with, I/O devices (e.g., 111, 112, 114, 115, 116). For example, in some cases, the I/O devices comprise one or more of the following: touch screens, cameras, microphones, speakers, accelerometers, gyroscopes, magnetometers, inertial measurement units, pressure sensors, touch sensors, capacitive sensors, buttons, dials, sliders, transducers (e.g., haptic transducers), graphical user interfaces, electronic display screens, and projectors.

In illustrative implementations, a human inputs data or instructions via one or more I/O devices. One or more computers output data or instructions via one or more I/O devices.

Actuators

In illustrative implementations, the additive manufacturing system includes actuators. For example, in some cases: (a) one or more actuators in a motion system move the extruder; and (B) one or more actuators in an extruder actuate one or more screws, gears, rams, pistons or pumps that cause material to be extruded through a nozzle.

In illustrative implementations, each actuator (including each actuator for actuating any movement) may be any kind of actuator, including a linear, rotary, electrical, piezoelectric, electro-active polymer, mechanical or electro-mechanical actuator. In some cases, the actuator includes and is powered by an electrical motor, including any stepper motor or servomotor. In some cases, the actuator includes a gear assembly, drive train, pivot, joint, rod, arm, or other component for transmitting motion. In some cases, one or more sensors are used to detect position, displacement or other data for feedback to one of more of the actuators.

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

To compute "based on" specified data means to perform a computation that takes the specified data as an input.

The term "comprise" (and grammatical variations thereof) shall be construed as if followed by "without limitation". If A comprises B, then A includes B and may include other things.

A digital computer is a non-limiting example of a "computer". An analog computer is a non-limiting example of a "computer". A computer that performs both analog and digital computations is a non-limiting example of a "computer". However, a human is not a "computer", as that term is used herein.

"Computer Tasks" is defined above.

As used herein, to "cure" an object means to reduce water content of the object. A non-limiting example of "curing" an object is allow water to evaporate from the object. Another non-limiting example of "curing" an object is to increase the rate of evaporation of water from the object, such as by heating the object or increasing flow of air over the object.

"Defined Term" means a term or phrase that is set forth in quotation marks in this Definitions section.

"Deposition path" means a straight or curved segment of a toolpath, in which segment an extruder travels while depositing material.

To say that X is "due" to Y and Z means that X is caused by factors that include Y and Z.

For an event to occur "during" a time period, it is not necessary that the event occur throughout the entire time period. For example, an event that occurs during only a portion of a given time period occurs "during" the given time period.

The term "e.g." means for example.

The fact that an "example" or multiple examples of something are given does not imply that they are the only instances of that thing. An example (or a group of examples) is merely a non-exhaustive and non-limiting illustration.

The term "extrude" means to force or pass material through an orifice. Here are two non-limiting examples of "extrusion": (a) forcing or passing a soft paste or other non-Newtonian fluid through a nozzle; and (b) ejecting ink from an inkjet printhead.

"Extruder" means an apparatus that extrudes material.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"I/O device" means an input/output device. Non-limiting examples of an I/O device include a touch screen, other electronic display screen, keyboard, mouse, microphone, handheld electronic game controller, digital stylus, display screen, speaker, or projector for projecting a visual display.

"Nozzle" means an apparatus that has an orifice through which material passes or is forced. As used herein: (a) the term "nozzle" does not imply any shape of the apparatus; and (b) the term "nozzle" has no implication regarding whether the nozzle is configured to accelerate material as it approaches or passes through the orifice.

Unless the context clearly indicates otherwise, "or" means and/or. For example, A or B is true if A is true, or B is true, or both A and B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or may be ignored.

As used herein, to say that q has a concentration of "y % m/v" in a mixture means that $$\frac{\text{mass of } q \text{ in the mixture, in grams}}{\text{volume of mixture, in milliliters}} \times 100\% = y\ \%.$$

For instance, if a mixture has a volume of 100 milliliters and the concentration of pectin in the mixture is 30% w/v, then there are 30 grams of pectin in the mixture. Likewise, to describe q's concentration in a mixture as y % q w/v means that $$\frac{\text{mass of } q \text{ in the mixture, in grams}}{\text{volume of mixture, in milliliters}} \times 100\% = y\ \%.$$

For instance, if a mixture has a volume of 100 milliliters and the concentration of pectin in the mixture is 30% pectin w/v, then there are 30 grams of pectin in the mixture.

As used herein, to say that q has a concentration of "y % v/v" in a mixture means that $$\frac{\text{volume of } q \text{ in the mixture}}{\text{total volume of mixture}} \times 100\% = y\ \%.$$

For instance, if a mixture has a volume of 100 milliliters and the concentration of glycerin in the mixture is 3% v/v, then there are 3 milliliters of glycerin in the mixture. Likewise, to describe q's concentration in a mixture as y % q w/v means that $$\frac{\text{volume of } q \text{ in the mixture}}{\text{total volume of mixture}} \times 100\% = y\ \%.$$

For instance, if a mixture has a volume of 100 milliliters and the concentration of glycerin in the mixture is 3% glycerin v/v, then there are 3 milliliters of glycerin in the mixture.

As used herein, the term "set" does not include a group with no elements.

Unless the context clearly indicates otherwise, "some" means one or more.

As used herein, a "subset" of a set consists of less than all of the elements of the set.

The term "such as" means for example.

As used herein, "surface roughness" of a surface means the average feature height of the surface, as determinable by atomic force microscopy.

"3D" means three dimensional.

To say that a machine-readable medium is "transitory" means that the medium is a transitory signal, such as an electromagnetic wave.

A non-limiting example of a "2.5 D" pattern (or a 2.5 dimensional pattern) is a bas-relief.

"Water" means the compound $H_2O$. As used herein, "water" may be in any physical state, including liquid, solid, or gaseous.

Except to the extent that the context clearly requires otherwise, if steps in a method are described herein, then the method includes variations in which: (1) steps in the method occur in any order or sequence, including any order or sequence different than that described herein; (2) any step or steps in the method occur more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to different things each time that the given step occurs; (7) one or more steps occur simultaneously; or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage and any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a method comprising: (a) making a first mixture by mixing, with water, 30%-35% pectin w/v, then 1%-2% alginate w/v, and then 3%-5% glycerin v/v; (b) making a second mixture by mixing, with water, 25%-29% pectin w/v, then 6%-8% calcium caseinate w/v, then 3%-5% glycerin v/v and then 1% sodium hydroxide v/v; (c) fabricating a single, unitary object by depositing multiple materials, in such a way that (i) the multiple materials include the first and second materials, and (ii) immediately after the depositing is completed, the first and second materials each have a non-uniform spatial distribution in the object, the spatial distribution of the first material being different than that of the second material; and (d) after the depositing, curing the object to produce a cured object. In some cases, the depositing is performed in such a way that, after the depositing (a) a first region of the object consists of only the first material; and (b) a second region of the object consists of only the second material. In some cases: (a) the depositing is performed in such a way that, immediately after the depositing (i) the object includes a first region and a second region, (ii) the first region consists of only the first material, and (iii) the second region consists of only the second material; and (b) due to the curing and due to material properties of the first and second materials (i) immediately after the curing, the first region has a first external surface with a first surface roughness, (ii) immediately after the curing, the second region has a second external surface with a second surface roughness, and (iii) the second surface roughness is greater than the first surface roughness. In some cases, the second external surface tends to retain water for longer than does the first external surface. In some cases, the method further comprises depositing cells in such a way that the cells are touching, or are at least partially surrounded by, the second region but are not part of the second region. In some cases, the depositing is performed in such a way that, immediately after the depositing (a) the object includes a first region and a second region; and (b) concentration of the first material relative to the second material is greater in the first region than in the second region. In some cases: (a) the depositing is performed in such a way that, immediately after the depositing (i) the object includes a first region and a second region, and (ii) concentration of the first material relative to the second material is greater in the first region than in the second region; and (b) due to the curing and due to material properties of the first and second materials (i) immediately after the curing, the first region has a first external surface with a first surface roughness, (ii) immediately after the curing, the second region has a second external surface with a second surface roughness, and (iii) the second surface roughness is greater than the first surface roughness. In some cases, the second external surface tends to retain water for longer than does the first external surface. In some cases, the method further comprises depositing cells in such a way that the cells are touching, or are at least partially surrounded by, the second region but are not part of the second region. Each of the cases described above in this paragraph is an example of the method described in the first sentence of this paragraph, and is also an example of an embodiment of this invention that may be combined with other embodiments of this invention.

In some implementations, this invention is a method comprising making a mixture by mixing, with water, 30%-35% pectin w/v, then 1%-2% alginate w/v, and then 3%-5% glycerin v/v. The embodiment of this invention that is described in the preceding sentence may be combined with other embodiments of this invention.

In some implementations, this invention is a method comprising making a mixture by mixing, with water, 25%-29% pectin w/v, then 6%-8% calcium caseinate w/v, then 3%-5% glycerin v/v and then 1% sodium hydroxide v/v. The embodiment of this invention that is described in the preceding sentence may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure, diagram, schematic or drawing herein (or in the Provisional) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the items (including hardware, hardware components, methods, processes, steps, software, algorithms, features, or technology) that are described herein.

What is claimed:

1. A method comprising:
   (a) making a first mixture by mixing, with water, 30%-35% pectin w/v, then 1%-2% alginate w/v, and then 3%-5% glycerin v/v;
   (b) making a second mixture by mixing, with water, 25%-29% pectin w/v, then 6%-8% calcium caseinate w/v, then 3%-5% glycerin v/v and then 1% sodium hydroxide v/v;
   (c) fabricating a single, unitary object by depositing multiple materials, in such a way that
      (i) the multiple materials include the first and second materials, and
      (ii) immediately after the depositing is completed, the first and second materials each have a non-uniform spatial distribution in the object, the spatial distribution of the first material being different than that of the second material; and
   (d) after the depositing, curing the object to produce a cured object.

2. The method of claim 1, wherein the depositing is performed in such a way that, after the depositing
   (a) a first region of the object consists of only the first material; and
   (b) a second region of the object consists of only the second material.

3. The method of claim 1, wherein:
   (a) the depositing is performed in such a way that, immediately after the depositing
      (i) the object includes a first region and a second region,
      (ii) the first region consists of only the first material, and
      (iii) the second region consists of only the second material; and
   (b) due to the curing and due to material properties of the first and second materials
      (i) immediately after the curing, the first region has a first external surface with a first surface roughness,
      (ii) immediately after the curing, the second region has a second external surface with a second surface roughness, and
      (iii) the second surface roughness is greater than the first surface roughness.

4. The method of claim 3, wherein the second external surface tends to retain water for longer than does the first external surface.

5. The method of claim 4, wherein the method further comprises depositing cells in such a way that the cells are touching, or are at least partially surrounded by, the second region but are not part of the second region.

6. The method of claim 1, wherein the depositing is performed in such a way that, immediately after the depositing
   (a) the object includes a first region and a second region; and
   (b) concentration of the first material relative to the second material is greater in the first region than in the second region.

7. The method of claim 1, wherein:
   (a) the depositing is performed in such a way that, immediately after the depositing
      (i) the object includes a first region and a second region, and
      (ii) concentration of the first material relative to the second material is greater in the first region than in the second region; and
   (b) due to the curing and due to material properties of the first and second materials
      (i) immediately after the curing, the first region has a first external surface with a first surface roughness,
      (ii) immediately after the curing, the second region has a second external surface with a second surface roughness, and
      (iii) the second surface roughness is greater than the first surface roughness.

8. The method of claim 7, wherein the second external surface tends to retain water for longer than does the first external surface.

9. The method of claim 8, wherein the method further comprises depositing cells in such a way that the cells are touching, or are at least partially surrounded by, the second region but are not part of the second region.

* * * * *